(12) United States Patent
Kamiya et al.

(10) Patent No.: US 11,710,429 B2
(45) Date of Patent: Jul. 25, 2023

(54) DISPLAY CONTROL DEVICE AND NON-TRANSITORY COMPUTER READABLE STORAGE MEDIUM FOR DISPLAY CONTROL BY HEAD-UP DISPLAY

(71) Applicant: DENSO CORPORATION, Kariya (JP)

(72) Inventors: Akira Kamiya, Kariya (JP); Daisuke Takemori, Kariya (JP); Kazuki Kojima, Kariya (JP)

(73) Assignee: DENSO CORPORATION, Kariya (JP)

( * ) Notice: Subject to any disclaimer, the term of this patent is extended or adjusted under 35 U.S.C. 154(b) by 46 days.

(21) Appl. No.: 17/540,857

(22) Filed: Dec. 2, 2021

(65) Prior Publication Data

US 2022/0093020 A1 Mar. 24, 2022

Related U.S. Application Data

(63) Continuation of application No. PCT/JP2020/012382, filed on Mar. 19, 2020.

(30) Foreign Application Priority Data

Jun. 5, 2019 (JP) ................................. 2019-105594

(51) Int. Cl.
*G09G 3/00* (2006.01)

(52) U.S. Cl.
CPC ..... *G09G 3/002* (2013.01); *G09G 2320/0686* (2013.01); *G09G 2340/12* (2013.01); *G09G 2380/10* (2013.01)

(58) Field of Classification Search
CPC ...................................................... G09G 3/002
See application file for complete search history.

(56) References Cited

U.S. PATENT DOCUMENTS

2016/0327402 A1  11/2016  Funabiki et al.
2019/0359228 A1  11/2019  Banno et al.

FOREIGN PATENT DOCUMENTS

| JP | 2018-127204 A | 8/2018 |
| JP | 2019-012483 A | 1/2019 |
| WO | WO-2015-118859 A1 | 8/2015 |

*Primary Examiner* — Gustavo Polo
(74) *Attorney, Agent, or Firm* — Harness, Dickey & Pierce, P.L.C.

(57) ABSTRACT

A display control device controls a superimposed display of a content by a head-up display for a vehicle. The display control device estimates a visible area of a road surface in a foreground included in an angle of view of the head-up display, and an invisible area of the road surface in the foreground included in the angle of view; distinguishes, in a route content, a visible part superimposed in the visible area, an invisible part superimposed in the invisible area, and an overlapping portion between the visible part and the invisible part; and causes the overlapping portion to be displayed in a display mode different from display modes of a visible non-overlapping portion of the visible part out of the overlapping portion and an invisible non-overlapping portion of the invisible part out of the overlapping portion.

9 Claims, 12 Drawing Sheets

DISPLAY CONTROL DEVICE AND NON-TRANSITORY COMPUTER READABLE STORAGE MEDIUM FOR DISPLAY CONTROL BY HEAD-UP DISPLAY

CROSS REFERENCE TO RELATED APPLICATIONS

The present application is a continuation application of International Patent Application No. PCT/JP2020/012382 filed on Mar. 19, 2020, which designated the U.S. and claims the benefit of priority from Japanese Patent Application No. 2019-105594 filed on Jun. 5, 2019. The entire disclosures of all of the above applications are incorporated herein by reference.

TECHNICAL FIELD

The present disclosure relates to a display control device and a non-transitory computer readable storage medium for controlling display of a virtual image by a head-up display.

BACKGROUND

There is a display device for a vehicle that displays a content in a superimposed manner by a head-up display. Such a vehicle display device displays a content indicating a route from a traveling position of a subject vehicle to a guidance point to be superimposed on a front view of a driver.

SUMMARY

The present disclosure describes a display control device and a non-transitory computer readable storage medium for control of a superimposed display of a content by a head-up display for a vehicle, which are capable of realizing an easy-to-understand display for an occupant.

BRIEF DESCRIPTION OF DRAWINGS

Features and advantages of the present disclosure will become more apparent from the following detailed description made with reference to the accompanying drawings, in which.

DETAILED DESCRIPTION

Figure 1:
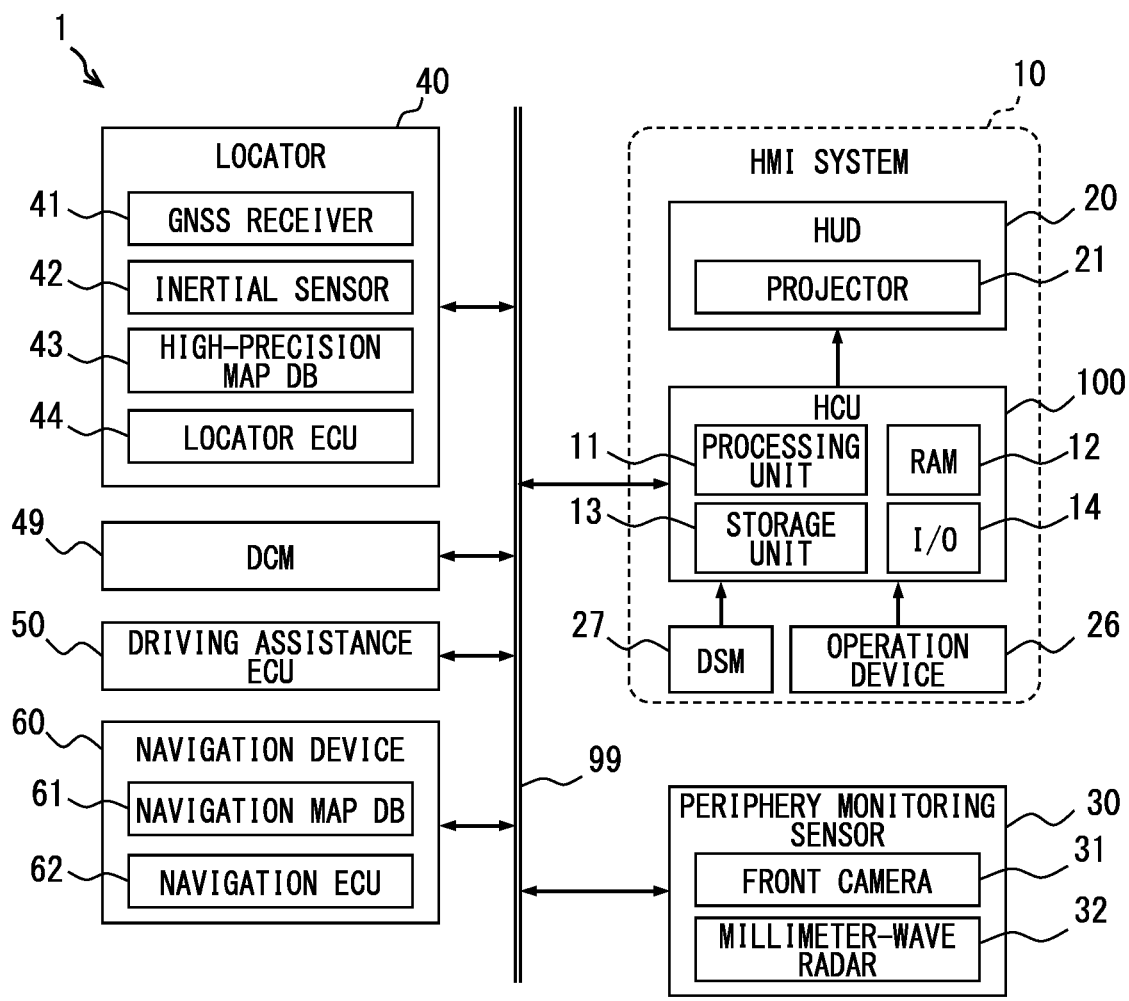
FIG. 1 is a diagram showing an overall image of an in-vehicle network including an HCU according to a first embodiment of the present disclosure.

In a display device for a vehicle that displays a content in a superimposed manner, the content is superimposed in an area visible from an occupant in a foreground. Depending on the surrounding conditions such as a road structure, the content may be superimposed on the foreground over the visible area and an invisible area from the occupant within an angle of view of the head-up display.

The present disclosure provides a display control device and a non-transitory computer readable storage medium for display control, which are capable of realizing an easy-to-understand display for an occupant.

According to a first aspect of the present disclosure, a display control device is used for a vehicle to control a superimposed display of a content by a head-up display. The display control device includes: an estimation unit that estimates a visible area that is a part of a road surface in a foreground included in an angle of view of the head-up display and is visible from an occupant, and an invisible area that is a part of the road surface in the foreground included in the angle of view of the head-up display and invisible from the occupant; and a display control unit that causes a route content presenting a scheduled traveling route of the vehicle to be superimposedly displayed on the road surface. The display control unit distinguishes, in the route content, a visible part superimposed in the visible area, an invisible part superimposed in the invisible area, and an overlapping portion at which the visible part and the invisible part overlap. The display control unit causes the overlapping portion to be displayed in a display mode different from a display mode of a visible non-overlapping portion and a display mode of an invisible non-overlapping portion, in which the visible non-overlapping portion is a portion of the visible part out of the overlapping portion, and the invisible non-overlapping portion is a portion of the invisible part out of the overlapping portion.

According to a second aspect of the present disclosure, a display control program is used for a vehicle to control a superimposed display of a content by a head-up display. The display control program causes one or more processors to execute a process including: estimating a visible area that is a part of a road surface in a foreground included in an angle of view of the head-up display and is visible from an occupant, and an invisible area that is a part of the road surface in the foreground included in the angle of view of the head-up display and invisible from the occupant; distinguishing, in a route content that presents a scheduled traveling route of the vehicle and is superimposedly displayed on the road surface, a visible part superimposed in the visible area, an invisible part superimposed in the invisible area, and an overlapping portion at which the visible part and the invisible part overlap; and displaying the overlapping portion in a display mode different from a display mode of a visible non-overlapping portion and a display mode of an invisible non-overlapping portion, in which the visible non-overlapping portion is a portion of the visible part out of the overlapping portion, and the invisible non-overlapping portion is a portion of the invisible part out of the overlapping portion.

According to a third aspect of the present disclosure, a non-transitory computer readable medium stores a computer program product comprising instructions for controlling a superimposed display of a content on a head-up display for a vehicle, and the instructions are configured to, when executed by one or more processors, to cause the one or more processors to: estimate a visible area that is a part of a road surface in a foreground included in an angle of view of the head-up display and is visible from an occupant, and an invisible area that is a part of the road surface in the foreground included in the angle of view of the head-up display and invisible from the occupant; distinguish, in a route content that presents a scheduled traveling route of the vehicle and is superimposedly displayed on the road surface, a visible part superimposed in the visible area, an invisible part superimposed in the invisible area, and an overlapping portion at which the visible part and the invisible part overlap; and display the overlapping portion in a display mode different from a display mode of a visible non-overlapping portion and a display mode of an invisible non-overlapping portion, in which the visible non-overlapping portion is a portion of the visible part out of the overlapping portion, and the invisible non-overlapping portion is a portion of the invisible part out of the overlapping portion.

According to the first to third aspects, the overlapping portion of the route content is displayed in a display mode different from those of the visible non-overlapping portion and invisible non-overlapping portion. Therefore, an occupant can visually distinguish the overlapping portion from the visible non-overlapping portion and the invisible non-overlapping portion. As such, the occupant can easily recognize the overlapping between the visible part and the invisible part of the route content. Accordingly, it is possible to provide the display control device, the display control program and the non-transitory computer-readable storage medium capable of presenting an easy-to-understand display to the occupant.

According to a fourth aspect of the present disclosure, a display control device is used for a vehicle to control a superimposed display of a content by a head-up display. The display control device includes: an estimation unit that estimates a visible area that is a part of a road surface in a foreground included in an angle of view of the head-up display and is visible from an occupant, and an invisible area that is a part of the road surface in the foreground included in the angle of view of the head-up display and invisible from the occupant; and a display control unit that causes a route content presenting a scheduled traveling route of the vehicle to be superimposedly displayed on the road surface. The display control unit distinguishes, in the route content, a visible part superimposed in the visible area, an invisible part superimposed in the invisible area, and an overlapping portion at which the visible part and the invisible part overlap. The display control unit causes an invisible non-overlapping portion, which is a portion of the invisible part out of the overlapping portion, to be displayed in a display mode different from a display mode of the visible part, and causes the overlapping portion to be displayed in a display mode same as the visible part.

According to a fifth aspect of the present disclosure, a display control program is used for a vehicle to control a superimposed display of a content by a head-up display. The display control program causes one or more processors to execute a process including: estimating a visible area that is a part of a road surface in a foreground included in an angle of view of the head-up display and is visible from an occupant, and an invisible area that is a part of the road surface in the foreground included in the angle of view of the head-up display and invisible from the occupant; distinguishing, in a route content that presents a scheduled traveling route of the vehicle and is superimposedly displayed on the road surface, a visible part superimposed in the visible area, an invisible part superimposed in the invisible area, and an overlapping portion at which the visible part and the invisible part overlap; and displaying an invisible non-overlapping portion, which is a portion of the invisible part out of the overlapping portion, in a display mode different from a display mode of the visible part, and the overlapping portion in a display mode same as the visible part.

According to a sixth aspect of the present disclosure, a non-transitory computer readable medium stores a computer program product comprising instructions for controlling a superimposed display of a content on a head-up display for a vehicle, and the instructions are configured to, when executed by one or more processors, to cause the one or more processors to: estimate a visible area that is a part of a road surface in a foreground included in an angle of view of the head-up display and is visible from an occupant, and an invisible area that is a part of the road surface in the foreground included in the angle of view of the head-up display and invisible from the occupant; distinguish, in a route content that presents a scheduled traveling route of the vehicle and is superimposedly displayed on the road surface, a visible part superimposed in the visible area, an invisible part superimposed in the invisible area, and an overlapping portion at which the visible part and the invisible part overlap; and display an invisible non-overlapping portion, which is a portion of the invisible part out of the overlapping portion, in a display mode different from a display mode of the visible part, and the overlapping portion in a display mode same as the visible part.

According to the fourth to sixth aspects, in the route content, the invisible non-overlapping portion is displayed in a display mode different from the visible part, and the overlapping portion is displayed in a display mode same as the visible part. Therefore, an occupant can recognize that a portion of the invisible part is hidden by the visible part. As such, the occupant can easily recognize the overlapping between the visible part and the invisible part of the route content. Accordingly, it is possible to provide the display control device, the display control program and the non-transitory computer-readable storage medium capable of presenting an easy-to-understand display to the occupant.

Embodiments of the present disclosure will be described hereinafter in detail.

First Embodiment

Figure 2:
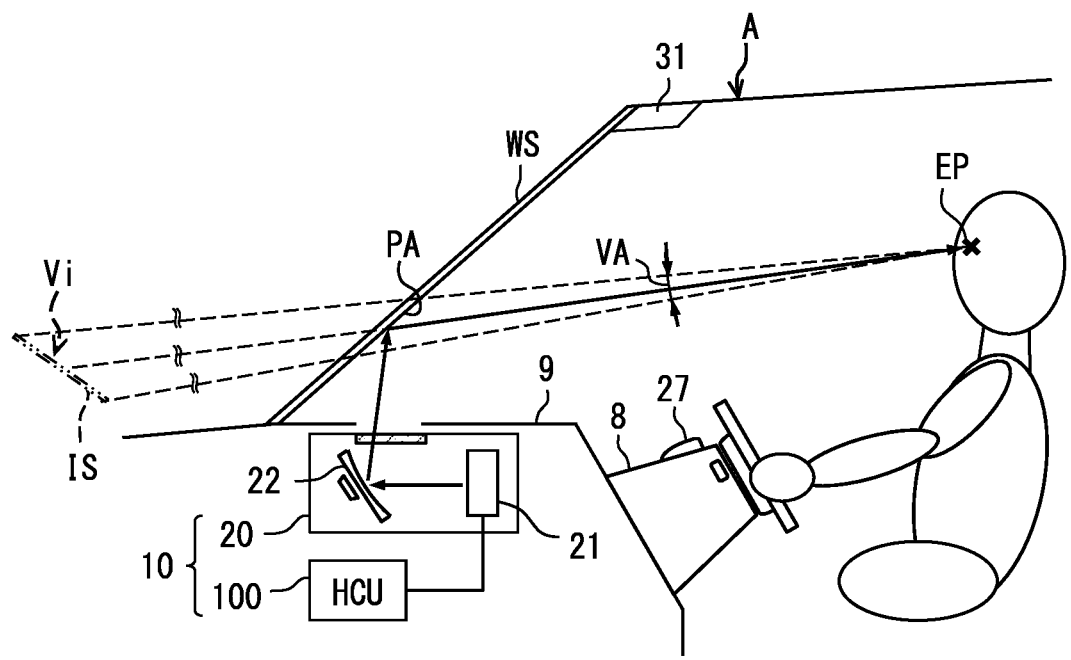
FIG. 2 is a diagram showing an example of a head-up display mounted on a vehicle.

Functions of a display control device according to a first embodiment of the present disclosure are realized by a human machine interface control unit (HCU) 100 shown in FIGS. 1 and 2. The HCU 100 constitutes a human machine interface (HMI) system 10 used in a vehicle A together with a head-up display (hereinafter, HUD) 20 and the like. The HMI system 10 further includes an operation device 26, a driver status monitor (DSM) 27, and the like. The HMI system 10 has an input interface function that accepts a user's operation made by an occupant (for example, a driver) of the vehicle A, and an output interface function that presents information to the driver.

The HMI system 10 is communicably connected to a communication bus 99 of an in-vehicle network 1 mounted on the vehicle A. The HMI system 10 is one of a plurality of nodes provided in the in-vehicle network 1. For example, a periphery monitoring sensor 30, a locator 40, a DCM49, a driving assistance electronic control unit (ECU) 50, a navigation device 60, and the like are connected to the communication bus 99 of the in-vehicle network 1 as nodes. These nodes connected to the communication bus 99 can communicate with one another.

The periphery monitoring sensor 30 is an autonomous sensor that monitors a peripheral environment of the vehicle A. The periphery monitoring sensor 30 can detect moving objects and stationary objects in a detection range around the subject vehicle. For example, the moving objects may include pedestrians, cyclists, non-human animals, and other vehicles, and the stationary objects may include falling objects on the road, guardrails, curbs, road markings, lane markings, structures beside the road. The periphery monitoring sensor 30 provides detection information of detecting an object around the vehicle A to the driving assistance ECU 50 and the like via the communication bus 99.

The periphery monitoring sensor 30 has a front camera 31 and a millimeter wave radar 32 as devices for object detection. The front camera 31 outputs at least one of image data obtained by photographing the front range of the vehicle A and an analysis result of the image data, as detection information. The multiple millimeter wave radars 32 are arranged, for example, on the front and rear bumpers of the vehicle A at intervals from each other. The millimeter wave radars 32 emit millimeter waves or quasi-millimeter waves toward the front range, the front side range, the rear range, the rear side range, and the like of the vehicle A. The millimeter wave radar 32 generates detection information by a process of receiving reflected waves reflected by a moving object, a stationary object, or the like. The periphery monitoring sensor 30 may include detection devices such as lidar and sonar.

The locator 40 generates highly accurate position information of the vehicle A by a complex positioning method that combines multiple types and pieces of acquired information. The locator 40 can specify a travelling lane on which the vehicle A travels among multiple lanes. The locator 40 includes a global navigation satellite system (GNSS) receiver 41, an inertial sensor 42, a high-precision map database (hereinafter, high-precision map DB) 43, and a locator ECU 44.

The GNSS receiver 41 receives positioning signals transmitted from multiple artificial satellites, such as positioning satellites. The GNSS receiver 41 is capable of receiving positioning signals from respective positioning satellites of at least one satellite positioning system among multiple satellite positioning systems such as GPS, GLONASS, Galileo, IRNSS, QZSS, and Beidou.

The inertial sensor 42 has, for example, a gyro sensor and an acceleration sensor. The high-precision map DB 43 is mainly made of a non-volatile memory, and stores map data with higher accuracy (hereinafter, "high-precision map data") than that used for normal navigation. The high-precision map data holds detailed information at least for information in the height (z) direction. The high-precision map data includes information that can be used for advanced driving support and automatic driving, such as three-dimensional road shape information (road structure information), lane number information, and information indicating the direction of travel allowed for each lane.

The locator ECU 44 mainly includes a microcomputer equipped with a processor, a RAM, a storage unit, an input/output interface, and a bus connecting these elements. The locator ECU 44 combines a positioning signal received by the GNSS receiver 41, a measurement result of the inertial sensor 42, a vehicle speed information output to the communication bus 99, and the like, and sequentially determines the position, the traveling direction, and the like of the vehicle A. The locator ECU 44 provides the position information and direction information of the vehicle A based on the positioning result to the HCU 100, the driving assistance ECU 50, and the like through the communication bus 99.

The vehicle speed information is information indicating a current traveling speed of the vehicle A, and is generated based on a detection signal of a wheel speed sensor provided in the hub portion of each wheel of the vehicle A. The node (ECU) that generates and outputs the vehicle speed information to the communication bus 99 may be appropriately changed. For example, a brake control ECU that controls the distribution of braking forces for the respective wheels, or an in-vehicle ECU such as the HCU100 is electrically connected to the wheel speed sensors of the respective wheels, and continuously generates the vehicle speed information and outputs the vehicle speed information to the communication bus 99.

In response to a request from the HCU 100, the driving assistance ECU 50 or the like, the locator ECU 44 determines whether or not the high-precision map DB 43 includes the required high-precision map data. When the requested high-precision map data is included in the high-precision map DB 43, the locator ECU 44 reads the corresponding high-precision map data from the high-precision map DB 43 and provides the corresponding high-precision map data to the request source ECU.

The data communication module (DCM) 49 is a communication module mounted on the vehicle A. The DCM49 transmits and receives radio waves to and from base stations around the vehicle A by wireless communication compliant with communication standards such as long term evolution (LTE) and 5G. When equipped with the DCM 49, the vehicle A is regarded as a connected car that can be connected to the Internet. The DCM49 can acquire the latest high-precision map data from a cloud-based probe server. The DCM49 cooperates with the locator ECU 44 to update the high-precision map data stored in the high-precision map DB 43 to the latest information.

The driving assistance ECU 50 mainly includes a computer equipped with a processor, RAM, a storage unit, an input/output interface, a bus connecting these elements, and the like. The driving assistance ECU 50 has a driving assistance function to assist the driving operation of a driver. As an example, the driving assistance ECU 50 enables partial automatic driving control (advanced driving support) of level 2 or lower, which is specified in an automatic driving level by the American Society of Automotive Engineers of Japan.

The driving assistance ECU 50 recognizes traveling environment around the vehicle A based on the detection information acquired from the periphery monitoring sensor 30. The driving assistance ECU 50 provides the HCU 100 with the analysis result of the detection information carried out for recognizing the traveling environment as the analyzed detection information. As an example, the driving assistance ECU 50 can provide the HCU 100 with the relative positions of road edges of the road or the left and right lane markings of the lane on which the vehicle A is currently traveling (hereinafter, "subject vehicle lane Lns", see FIG. 4). The left-right direction is a direction that coincides with the width direction of the vehicle A stationary on the horizontal plane, and is set with reference to the traveling direction of the vehicle A.

The driving assistance ECU 50 can exert a plurality of functions for realizing advanced driving support by executing the program stored in the storage unit by the processor. For example, the driving assistance ECU 50 has an ACC (Adaptive Cruise Control) control unit and an LTC control unit. The ACC control unit is a functional unit that realizes the functions of the ACC. The ACC control unit causes the vehicle A to constantly travel at a target vehicle speed, or causes the vehicle A to follow a vehicle in front while maintaining the inter-vehicle distance from the vehicle in front. The LTC control unit is a functional unit that realizes the function of LTC (Lane Trace Control). The LTC control unit causes the vehicle A to travel in the subject vehicle lane in cooperation with the ACC control unit according to a scheduled traveling line generated along the subject vehicle lane Lns on which the vehicle A is currently traveling.

The navigation device 60 searches for a route to a destination to be set and guides the vehicle along the searched route. The navigation device 60 includes a navigation map database (hereinafter, navigation map DB) 61 and a navigation ECU 62.

The navigation ECU 62 is mainly composed of a microcomputer provided with a processor, RAM, a storage unit, an input/output interface, a bus connecting these elements, and the like. The navigation ECU 62 acquires the position information and the direction information of the vehicle A (subject vehicle) from the locator ECU 44 through the communication bus 99. The navigation ECU 62 acquires the operation information input to an operation device 26 through the communication bus 99 and the HCU 100, and sets the destination based on the driver operation. The navigation ECU 62 searches for a plurality of routes to the destination so as to satisfy conditions such as time priority and distance priority. When one of the searched routes is selected, the navigation ECU 62 provides the route information based on the set route to the HCU 100 through the communication bus 99 together with the related navigation map data.

In addition, when the vehicle A approaches a guidance point GP such as an intersection or a branch point that makes a right or left turn included in the set route, the navigation ECU 62 sequentially outputs a guidance execution request toward the HCU 100. The guidance point GP is set near the center of each of the intersection section and the branching section as an example. The guidance point GP may be set on the near side or the far side of each of the intersection section and the branching section.

The guidance execution request is guidance information used for route guidance to the driver. For example, the guidance execution request includes information on the position of the guidance point GP and information indicating a direction in which the vehicle A should proceed at the guidance point GP. The guidance execution request is output when the remaining distance Lr (see FIG. 4) from the vehicle A to the guidance point GP becomes less than a first threshold value (for example, about 300 m). The HCU 100 presents information related to route guidance based on the acquisition of the guidance execution request from the navigation ECU 62.

Next, details of the operation device 26, DSM27, HUD20, and HCU100 included in the HMI system 10 will be described in order based on FIGS. 1 and 2.

The operation device 26 is an input unit that accepts an operation of user, such as a driver. The operation device 26 receives a user's operation to start or stop a function, such as a driving assistance function and an automatic driving function. Specifically, the operation device 26 includes a steering switch provided on a spoke portion of the steering wheel, an operation lever provided on a steering column portion 8, a voice input device for detecting the driver's voice or speech, or the like.

The DSM 27 includes a near-infrared light source, a near-infrared camera, and a control unit for controlling the near-infrared light source and the near-infrared camera. The DSM 27 is installed, for example, on the upper surface of the steering column portion 8 or the upper surface of the instrument panel 9, so that the near-infrared camera faces the headrest portion of the driver's seat. The DSM 27 uses the near-infrared camera to capture the driver's head to which the near-infrared light is emitted from the near-infrared light source. The control unit applies image analysis to images captured by the near-infrared camera. The control unit extracts information on such as a position of the eye point EP and eye directions from the captured image, and successively outputs extracted state information to the HCU 100.

The HUD 20 is mounted on the vehicle A, as one of a plurality of in-vehicle display devices, together with a meter display, a center information display, and the like. The HUD 20 is electrically connected to the HCU 100 and successively acquires video data generated by the HCU 100. Based on the video data, the HUD 20 presents various information related to the vehicle A, such as route information, sign information, and control information of each in-vehicle function, to the driver using the virtual image Vi.

The HUD 20 is accommodated in a housing space inside the instrument panel 9 below a windshield WS. The HUD 20 projects the light formed as a virtual image Vi toward a projection range PA of the windshield WS. The light projected on the windshield WS is reflected toward the driver's seat in the projection range PA and is perceived by the driver. The driver visually recognizes a display in which a virtual image Vi is superimposed on the foreground visible through the projection range PA.

The HUD 20 includes a projector 21 and a magnifying optical system 22. The projector 21 includes a liquid crystal display (LCD) panel and a backlight. The projector 21 is fixed to a housing of the HUD 20 so that the display surface of the LCD panel faces the magnifying optical system 22. The projector 21 displays each frame image of the video data on the display surface of the LCD panel, and illuminates the display surface with the backlight that transmits the display surface. Thus, the light to be formed as a virtual image Vi is emitted toward the magnifying optical system 22. The magnifying optical system 22 includes at least one concave mirror in which a metal such as aluminum is vapor-deposited on the surface of a base material made of synthetic resin or glass. The magnifying optical system 22 projects the light emitted from the projector 21 on an upper projection range PA while spreading the light by reflection.

The HUD 20 is given the angle of view VA. A virtual range in the space to which the virtual image Vi can be formed by the HUD device 20 is defined as an imaging plane IS, and the angle of view VA is a viewing angle defined based on an virtual line connecting the driver's eye point EP and an outer edge of the image plane IS. The angle of view VA is a range of angle within which the driver can visually recognize the virtual image Vi when viewed from the eye point EP. In the HUD 20, a horizontal angle of view in the horizontal direction is larger than a vertical angle of view in the vertical direction. When viewed from the eye point EP, a front range that overlaps with the imaging plane IS is the range of the angle of view VA.

The HUD 20 displays a superimposition content CTs (see FIG. 6 and the like) and a non-superimposition content as virtual images Vi. The superimposition content CTs is an AR display object used for augmented reality (hereinafter referred to as "AR") display. The display position of the superimposition content CTs is associated with a specific superimposition target existing in the foreground, such as a specific position on the road surface, a vehicle in front, a pedestrian, and a road sign. The superimposition content CTs is displayed in a superimposing manner on a specific superimposition target in the foreground, and is seemingly fixed relative to the specific superimposition target to be able to follow the specific superimposition target corresponding to the driver's eye line. That is, the relative positional relationship is continuously maintained among the driver's eye point EP, the superimposition target in the foreground, and the superimposition content CTs. Therefore, the shape of the superimposition content CTs may be continuously updated at a predetermined cycle according to the relative position and shape of the superimposition target. The superimposition content CTs is displayed in an orientation closer to horizontal than the non-superimposition content, and has a display shape extended in the depth direction (traveling direction) as seen from the driver, for example.

The non-superimposition content is a non-AR display object, among the display objects displayed in a superimposing manner on the foreground excluding the superimposition content CTs. Unlike the superimposition content CTs, the non-superimposition content is displayed in a superimposing manner on the foreground without specifying the superimposition target. The non-superimposition content is displayed at a fixed position within the projection range PA, and thus is seemingly fixed relative to a vehicle structure such as the windshield WS.

The HCU 100 is an electronic control unit that integrally controls the display by a plurality of in-vehicle display devices including the HUD 20 in the HMI system 10. The HCU 100 mainly includes a computer equipped with a processing unit 11, a RAM 12, a storage unit 13, an input/output interface 14, and a bus connecting these elements. The processing unit 11 is a hardware combined with the RAM 12, and executes arithmetic processing. The processing unit 11 includes at least one arithmetic core, such as a central processing unit (CPU) or a graphics processing unit (GPU). The processing unit 11 may further include an field-programmable gate array (FPGA) and an IP core having other dedicated functions. The RAM 12 may include a video RAM for generating video. The processing unit 11 accesses the RAM 12 to execute various processes for providing the functions of the respective functional blocks, which will be described later. The storage unit 13 includes a non-volatile storage medium. The storage unit 13 stores various programs (display control programs, etc.) to be executed by the processing unit 11.

Figure 3:
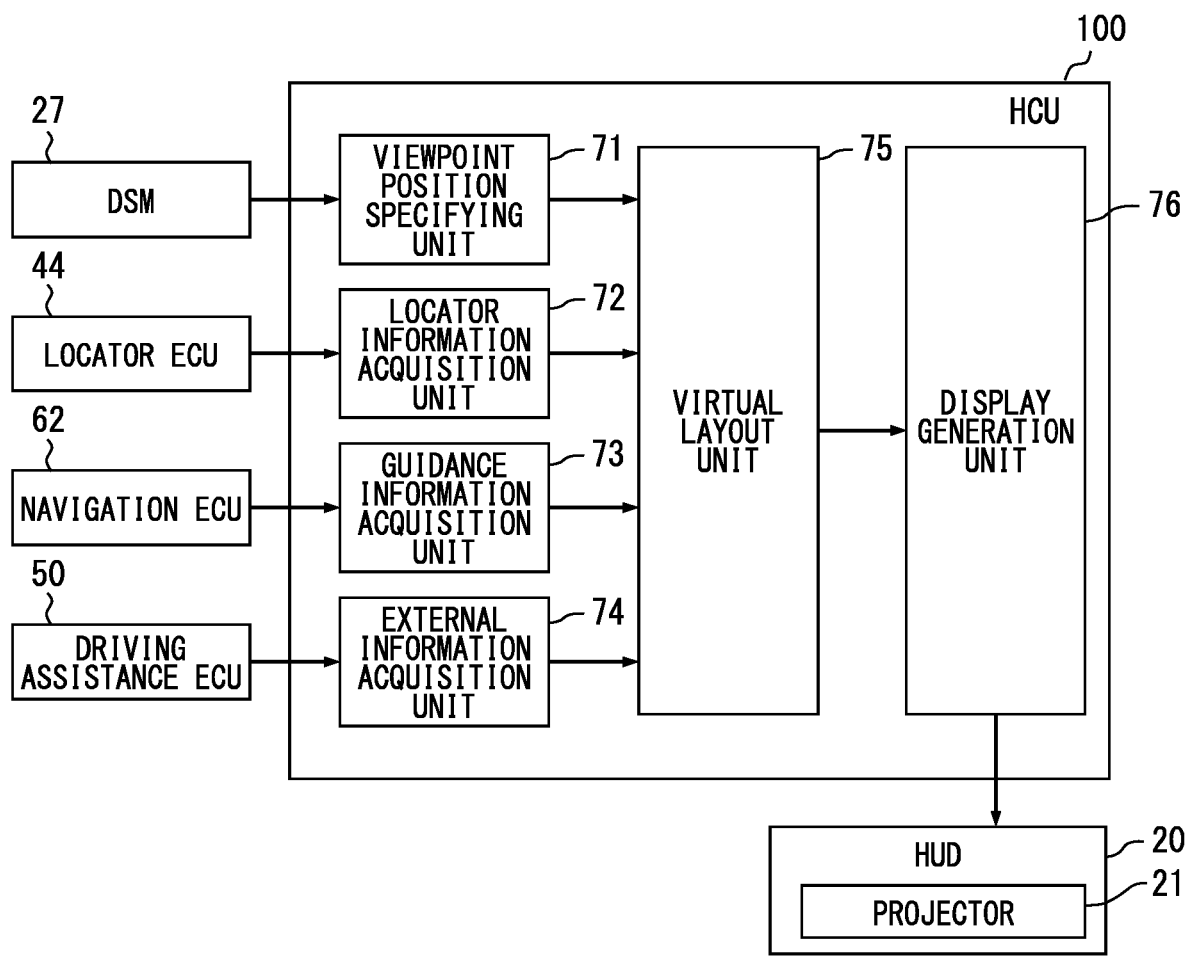
FIG. 3 is a diagram showing an example of a schematic configuration of the HCU.

The HCU 100 shown in FIGS. 1 to 3 has a plurality of functional units for controlling the superimposition display of the content by the HUD 20 by executing the display control program stored in the storage unit 13 by the processing unit 11. Specifically, the HCU 100 is provided with functional units such as a viewpoint position specifying unit 71, a locator information acquisition unit 72, a guidance information acquisition unit 73, an external information acquisition unit 74, a virtual layout unit 75, and a display generation unit 76.

The viewpoint position specifying unit 71 specifies a position of the eye point EP of the driver seated on the driver seat based on the state information acquired from the DSM 27. The viewpoint position specifying unit 71 generates three-dimensional coordinates (hereinafter, "eye point coordinates") indicating the position of the eye point EP, and sequentially provides the generated eye point coordinates to the virtual layout unit 75.

The locator information acquisition unit 72 acquires the latest position information and the direction information about the vehicle A from the locator ECU 44, as the subject vehicle position information. In addition, the locator information acquisition unit 72 acquires high-precision map data of the peripheral range of the vehicle A from the locator ECU 44. The locator information acquisition unit 72 sequentially provides the acquired vehicle position information and high-precision map data to the virtual layout unit 75.

The external information acquisition unit 74 acquires detection information about the peripheral range of the vehicle A, particularly the front range, from the driving assistance ECU 50. Specifically, the external information acquisition unit 74 acquires detection information indicating the relative positions of the left and right lane markings of the subject vehicle lane Lns or the road edges. The external information acquisition unit 74 sequentially provides the acquired detection information to the virtual layout unit 75. The external information acquisition unit 74 may acquire the imaging data of the front camera 31 as the detection information instead of the detection information as the analysis result acquired from the driving assistance ECU 50.

Figure 6:
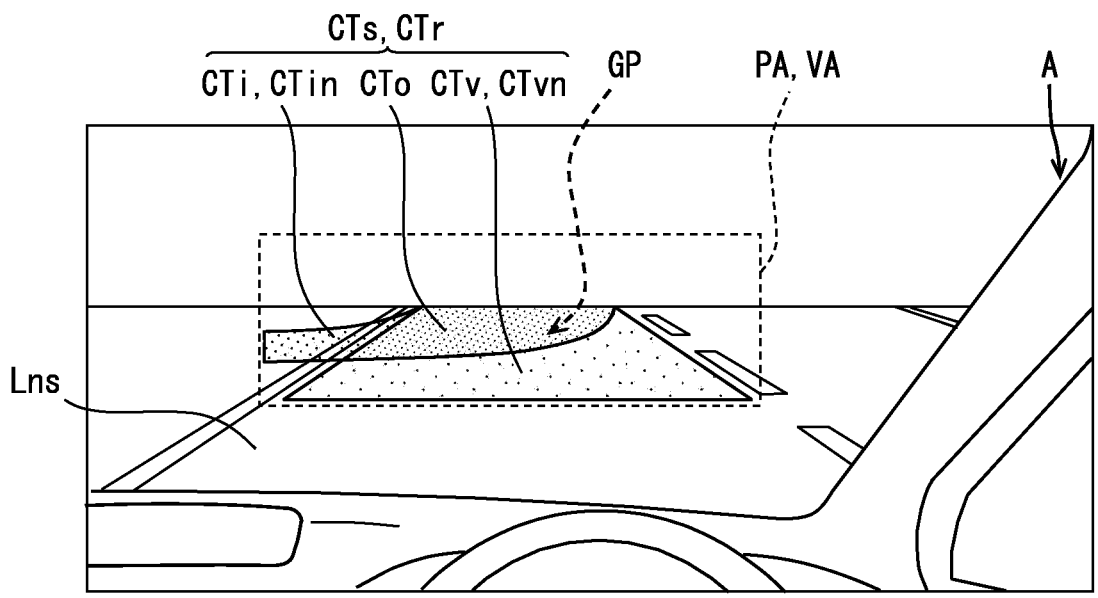
FIG. 6 is a diagram showing an example of a guidance display.

The virtual layout unit 75 has a function of selecting contents to be used for information presentation based on various acquired information and a function of simulating the display layout of a superimposition content CTs (see FIG. 6 and the like).

When acquiring the guidance execution request from the navigation device 60, the virtual layout unit 75 selects the content to be used for the route guidance at the guidance point GP. Specifically, the virtual layout unit 75 appropriately selects a content that guides a right or left turn at a branch point such as an intersection, a content that guides to travel straight ahead for a predetermined distance, a content that guides a lane change, and the like.

The virtual layout unit 75 executes a virtual layout function that simulates the display layout of the superimposition content CTs based on various information provided. When acquiring the guidance execution request from the navigation device 60, the virtual layout unit 75 reproduces the current traveling environment of the vehicle A in the virtual space based on the subject vehicle position information, high-precision map data, detection information, and the like.

Figure 4:
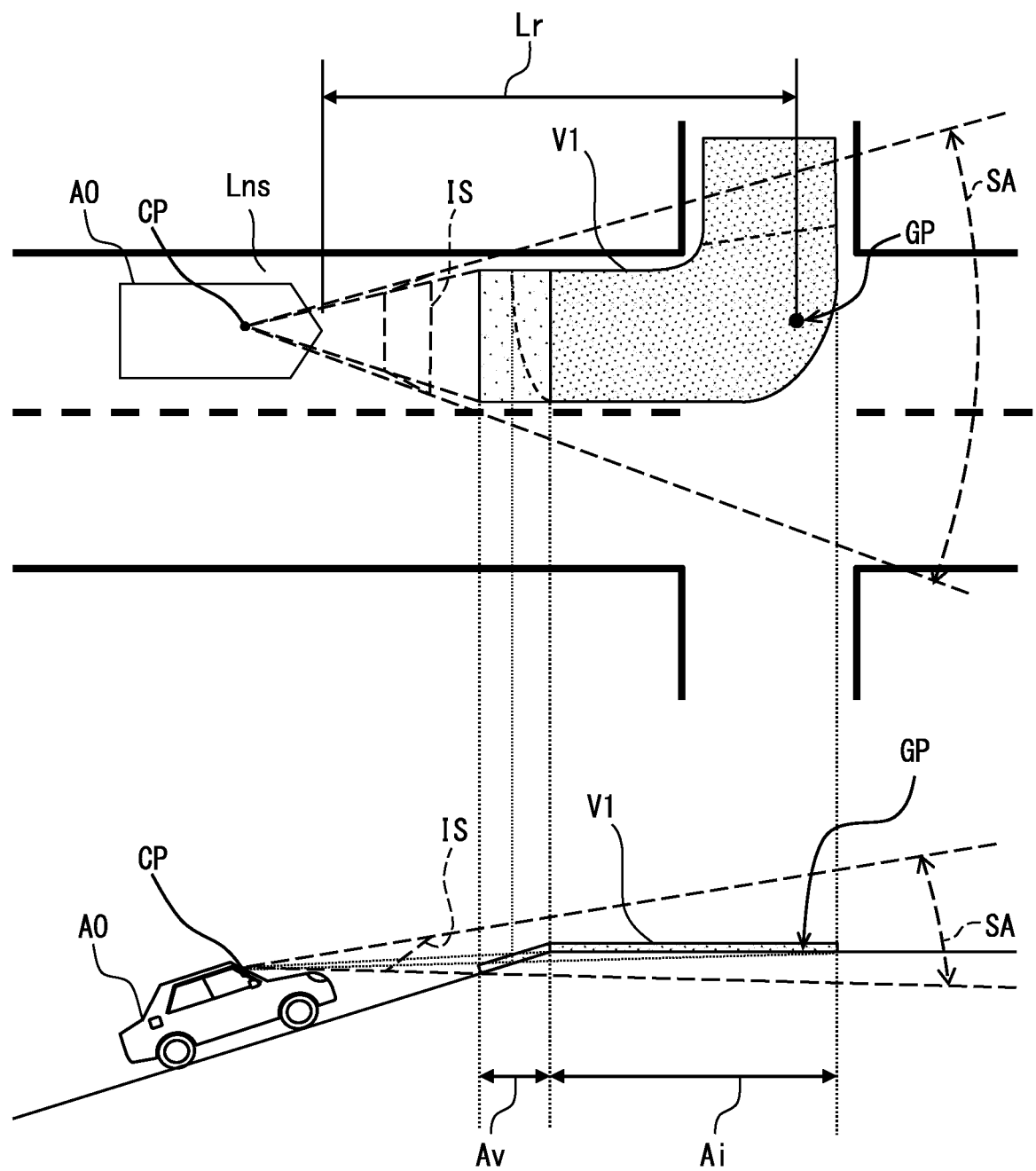
FIG. 4 is a diagram that visualizes and shows an example of a display layout simulation performed by a display generation unit of the HCU.

More specifically, as shown in FIGS. 2 to 4, the display generation unit 76 sets a subject vehicle object AO at a reference position in the virtual three-dimensional space. The display generation unit 76 maps the road model of the shape indicated by the high-precision map data to the three-dimensional space in association with the subject vehicle object AO based on the subject vehicle position information. The display generation unit 76 sets a scheduled traveling route based on the guidance information on the road model. The display generation unit 76 sets the virtual camera position CP and the superimposition range SA in association with the subject vehicle object AO.

The virtual camera position CP is a virtual position corresponding to the driver's eye point EP. The display generation unit 76 sequentially corrects the virtual camera position CP with respect to the subject vehicle object AO based on the latest eye point coordinates acquired by the viewpoint position specifying unit 71. The superimposition range SA is a range in which the virtual image Vi can be displayed in the superimposing manner. The display generation unit 76 sets a front range that is located inside the projection range PA when viewed forward from the virtual camera position CP as the superimposition range SA, based on the virtual camera position CP and the outer edge position (coordinates) information of the projection range PA stored in advance in the storage unit 13 (see FIG. 1) or the like. The superimposition range SA corresponds to the angle of view VA of the HUD20.

The virtual layout unit 75 arranges a virtual object V1 so as to overlap the scheduled traveling route arranged on the road surface of the road model in the three-dimensional space. The virtual object V1 is set in the virtual space when a route content CTr, which will be described later, is displayed as a virtual image. The virtual object V1 is a strip-shaped object arranged so as to cover the virtual road surface of the scheduled traveling route in a plane. The virtual object V1 has a curved shape connecting an approach lane and an exit lane, as shown in FIG. 4, in a scene of the right or left turn at the intersection. The virtual object V1 defines the position and shape of the route content CTr. That is, the shape of the virtual object V1 viewed from the virtual camera position CP becomes the virtual image shape of the route content CTr visually recognized from the eye point EP.

The virtual layout unit 75 estimates an in-view angle visible area Av and an in-view angle invisible area Ai based on the road structure model and the virtual camera position CP set inside the virtual space. The in-view angle visible area is an area of the road surface of the foreground inside the angle of view VA of the HUD 20 and visible from the driver. The in-view angle invisible area Ai is an area of the road surface of the foreground inside the angle of view VA of the HUD 20, but invisible from the driver. For example, as shown in FIG. 4, the virtual layout unit 75 sets a virtual road surface that intersects a straight line extending from the virtual camera position CP in the superimposition range SA as the in-view angle visible area Av. The virtual layout unit 75 sets a virtual road surface that is included in the superimposition range SA but does not intersect the straight line extending from the virtual camera position CP as the in-view angle invisible area Ai The virtual layout unit 75 estimates the in-view angle visible area Av and the in-view angle invisible area Ai for the range to arrange at least the virtual object V1 in the virtual road surface. The virtual layout unit 75 may indirectly determine the in-view angle visible area Av and the in-view angle invisible area Ai by estimating an object portion visible from the virtual cameral position CP and an object portion invisible from the virtual camera position CP in the virtual object V1 arranged on the virtual cameral position CP.

In the example of FIG. 4, the in-view angle visible area Av and the in-view angle invisible area Ai on a road having a structure in which a flat road extends from the end of an uphill road are shown. In the case of a road having such a structure, the flat road is obstructed by the uphill road and is invisible while traveling on the uphill road. Therefore, the virtual layout unit 75 estimates that the virtual road surface of the uphill road is the in-view angle visible area Av and the virtual road surface of the flat road is the in-view angle invisible area Ai. In addition, also in the case of a road having a structure in which a downhill road or an uphill road having a smaller slope ratio extends from the end of the uphill road, in place of the flat road, the virtual road surface ahead of the uphill road, rather than the uphill road in front, can be the in-view angle invisible area Ai. The virtual layout unit 75 is an example of an estimation unit.

The display generation unit 76 controls the presentation of information to the driver through the HUD 20 by a process of generating video data that is sequentially output to the HUD 20. The display generation unit 76 is an example of a display control unit. The display generation unit 76 has a function of drawing a content and a function of controlling a display period of the content, based on various information acquired. The display generation unit 76 determines an original image to be drawn on each frame image constituting the video data based on the selection result of the content acquired from the virtual layout unit 75. When drawing the original image of the superimposition content CTs (see FIG. 6 and the like) on the frame image, the display generation unit 76 corrects the drawing position and drawing shape of the original image in the frame image according to the eye point EP and each position of the superimposition target. Thus, the superimposition content CTs is displayed at the position and shape correctly superimposed on the superimposition target when viewed from the eye point EP.

The display generation unit 76 selects the content to be drawn in the video data based on the selection result of the content of the virtual layout unit 75 and the layout information as the simulation result using the virtual space. As an example, the display generation unit 76 draws a route content CTr (see FIGS. 5 to 7), which is the content related to the route guidance processing, and presents the route content CTr to the driver.

The route content CTr is a content used for displaying the scheduled traveling route of the vehicle A. The route content CTr is a superimposition content CTs to be superimposed on a road surface of the scheduled traveling route as the superimposition target, and the drawing shape of the route content CTr is determined based on the virtual object V1 arranged by the display simulation.

The route content CTr is drawn in a shape along the scheduled traveling route, and indicates the lane on which the vehicle A should travel, a point at which a right or left turn or a lane change is necessary, and the like. The route content CTr has a drawing shape that imitates the shape of the lane of the scheduled traveling route, and is a sheet shape extending in a strip shape along the traveling direction of the vehicle A. When the lane is straight, the route content CTr has a linear shape. When the lane is curved, the route content CTr has a curved shape along the curve. In the intersection, the route content CTr has a mode or shape that connects the approach lane and the exit lane on the scheduled traveling route. The drawing shape of the route content CTr is updated in a predetermined update cycle so as to match the shape of the road surface viewed from the eye point EP, according to the traveling of the vehicle A.

When drawing the route content CTr mentioned above, the display generation unit 76 distinguishes, in the route content CTr, between a visible part CTv superimposed in the in-view angle visible area Av of the road surface and an invisible part CTi superimposed in the in-view angle invisible area Ai of the road surface (see FIG. 6). Based on the result of the display simulation, the display generation unit 76 determines a content part of the virtual object V1 corresponding to the object part arranged in the in-view angle visible area Av, as the visible part CTv. The display generation unit 76 determines a content part corresponding to the object part arranged in the in-view angle invisible area Ai, as the invisible part CTi.

In addition, the display generation unit 76 distinguishes between an overlapping portion CTo where the visible part CTv and the invisible part CTi overlap and a non-overlapping portion where the visible part CTv and the invisible part CTi do not overlap, by using the result of the display simulation. The display generation unit 76 determines the content part corresponding to a range where the object part arranged in the in-view angle visible area Av and the object part arranged in the in-view angle invisible area Ai, when viewed forward from the virtual camera position CP, as the overlapping portion CTo. The display generation unit 76 determines a portion of the visible part CTv that does not overlap with the invisible part CTi as a visible non-overlapping portion CTvn. The display generation unit 76 determines a portion of the invisible part CTi that does not overlap with the visible part CTv as an invisible non-overlapping portion CTin.

The display generation unit 76 changes a display mode of the route content CTr according to the above-mentioned determination result and a remaining distance Lr to the guidance point GP. The change of the display mode will be described below with reference to FIGS. 4 to 6.

Figure 5:
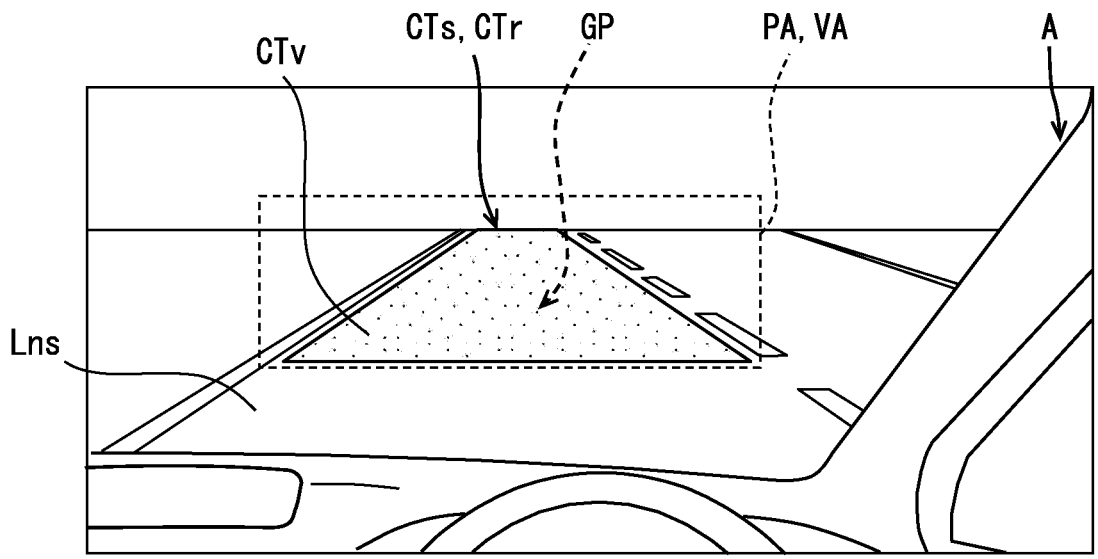
FIG. 5 is a diagram showing an example of a guidance display.

In a traveling section where the remaining distance Lr to the guidance point GP is less than a first threshold value and equal to or greater than a second threshold value (for example, about 100 m), the display generation unit 76 displays only the visible part CTv of the route content CTr prior to the invisible part CTi (see FIG. 5). The display generation unit 76 hides the invisible part CTi even when the road surface corresponding to the in-view angle invisible area Ai is included in the angle of view VA. As a result, the display generation unit 76 presents only the scheduled traveling route on the road surface visible from the driver, at the stage where the vehicle A is relatively far from the guidance point GP.

When the remaining distance Lr to the guidance point GP is less than the second threshold value, the display generation unit 76 causes both the visible part CTv and the invisible part CTi to be displayed (see FIG. 6). As a result, the display generation unit 76 causes the content including the scheduled traveling route on the road surface, which is invisible from the driver, to be presented to the driver when the vehicle A is relatively close to the guidance point GP. In the example of FIG. 6, the invisible part CTi indicates that it is necessary to turn left at a position beyond the in-view angle visible area Av. When displaying the invisible part CTi, the display generation unit 76 makes an animation display so that the invisible part CTi goes along the scheduled traveling route and extends in the traveling direction. In the example of FIG. 6, the animation display is made so that the invisible part CTi extends from the upper edge portion of the visible part CTv toward the vicinity of the left edge of the angle of view VA. When displaying the invisible part CTi, the display generation unit 76 may display the entire invisible part CTi including the overlapping portion CTo and the invisible non-overlapping portion CTin, or may display the overlapping portion CTo prior to the invisible non-overlapping portion CTin. In this case, the display generation unit 76 may display the invisible non-overlapping portion CTin when the remaining distance Lr becomes smaller.

In addition, the display generation unit 76 displays the visible non-overlapping portion CTvn, the invisible non-overlapping portion CTin, and the overlapping portion CTo in respectively different modes. As a result, the display generation unit 76 enables the driver to distinguish and visually recognize the overlapping portion of the route content CTr. Specifically, the display generation unit 76 sets the brightness of the overlapping portion CTo to be the lowest among the three portions CTvn, CTin, and CTo. In addition, the display generation unit 76 sets the brightness of the invisible non-overlapping portion CTin to be higher than the overlapping portion CTo and lower than the visible non-overlapping portion CTvn. As described above, the overlapping portion CTo is visually recognized as the darkest among the three portions constituting the route content CTr. In addition, the invisible non-overlapping portion CTin is visually recognized darker than the visible non-overlapping portion CTvn.

Figure 7:
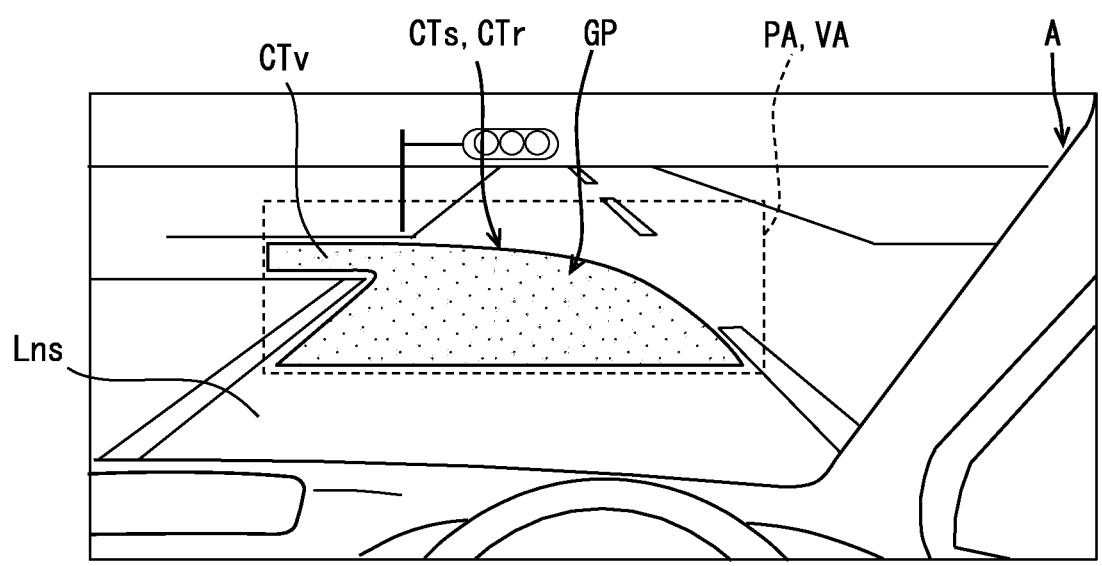
FIG. 7 is a diagram showing an example of a guidance display.

When the in-view angle invisible area Ai on the road surface enters the in-view angle visible area Av as the vehicle A travels, the display generation unit 76 changes the display mode of the corresponding portion of the route content CTr from the display mode of the invisible part CTi to the display mode of the visible part CTv (see FIG. 7). For example, when the vehicle A moves from an uphill road to a flat road, the in-view angle invisible area Ai gradually becomes the in-view angle visible area Av from the near side. In accordance with this change, the display generation unit 76 gradually changes the display mode of the portion displayed as the invisible part CTi to the display mode of the visible part CTv.

Figure 8:
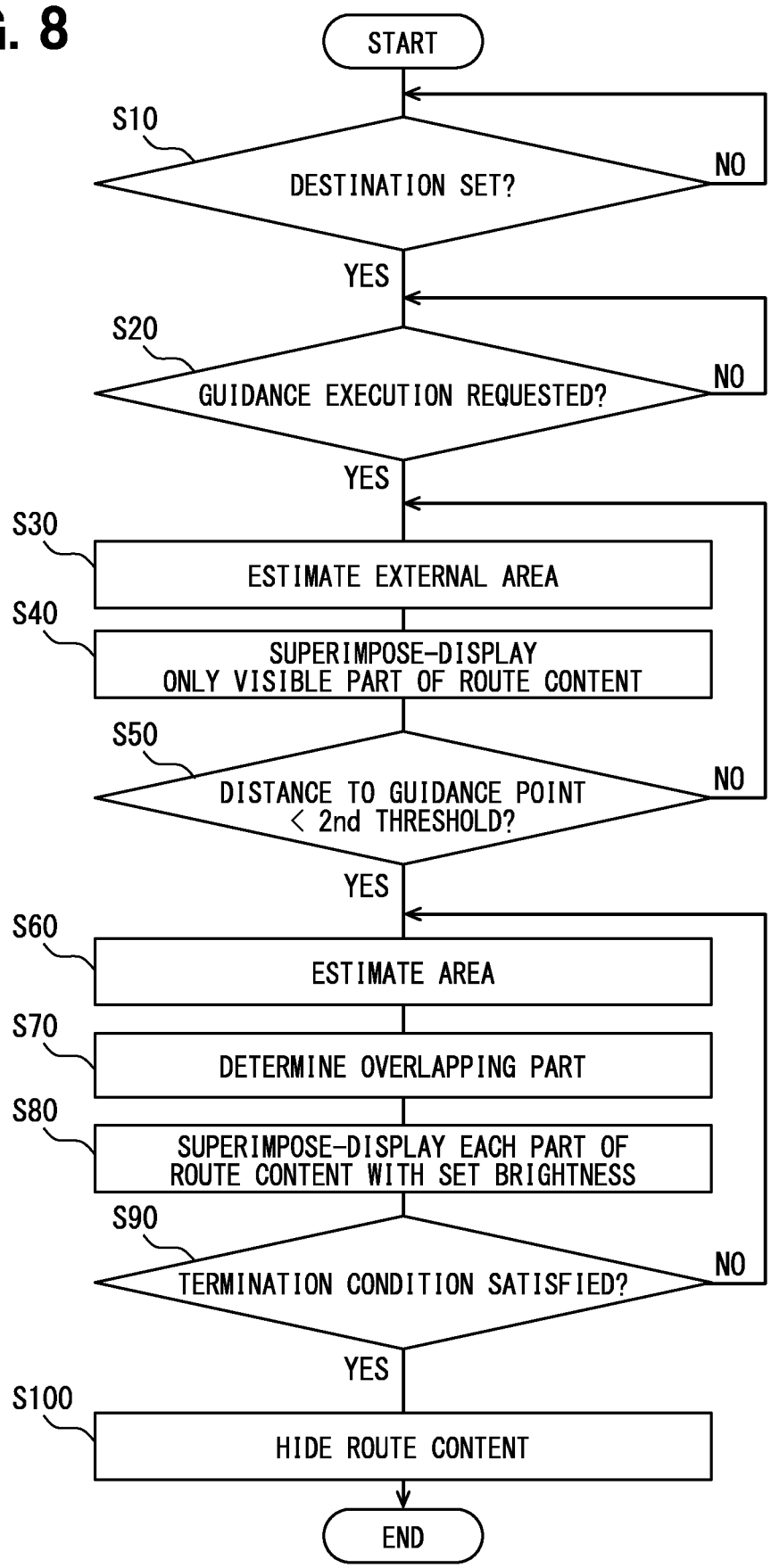
FIG. 8 is a flowchart showing a display control method according to the first embodiment.

Next, details of a display control method for switching each display related to the route guidance processing based on a display control program will be described below based on a flowchart shown in FIG. 8 with reference to FIGS. 3 and 5 to 7. A display control process shown in FIG. 8 is started by the HCU 100 that has completed the start-up process or the like, for example, by the switching of the vehicle power supply to an on state.

First, the HCU 100 determines in S10 whether or not the destination is set based on the information from the navigation ECU 62. When it is determined that the destination has not been set, the determination in S10 is repeated until the destination is set. When it is determined that the destination has been set, the process proceeds to S20.

In S20, it is determined whether or not the guidance execution request is received from the navigation ECU 62. In other words, it is determined whether or not the remaining distance Lr from the vehicle A to the guidance point GP is less than the first threshold value. When it is determined that the guidance execution request is not received, the determination in S20 is repeated until the guidance execution request is acquired. On the other hand, when it is determined that the guidance execution request is received, the process proceeds to S30.

In S30, a simulation of the display layout is executed, and the visible area Av and the invisible area Ai of the road surface are estimated. When each of the in-view angle visible area Av and the in-view angle invisible area Ai is estimated, the process proceeds to S40. In S40, only the visible part CTv of the route content CTr is superimposedly displayed on the road surface, and the invisible part CTi is hidden. That is, the route content CTr is superimposedly displayed only in the in-view angle visible area Av. When the superimposed display is executed, the process proceeds to S50.

In S50, it is determined whether or not the remaining distance Lr from the vehicle A to the guidance point GP is less than the second threshold value based on the subject vehicle position information from the locator ECU 44 and the position information of the guidance point GP from the navigation ECU 62. While the remaining distance Lr is being determined equal to or greater than the second threshold value, the processes of S30 and S40 are repeated, and the drawing shape of the visible part CTv is updated according to the change of each of the in-view angle visible area Av and the in-view angle invisible area Ai with the traveling. On the other hand, when it is determined that the remaining distance Lr is less than the second threshold value, the process proceeds to S60.

In S60, the in-view angle visible area Av and the in-view angle invisible Ai are estimated again, and the process proceeds to S70. In S70, based on the in-view angle visible area Av and the in-view angle invisible Ai estimated in S60, the visible part CTv, the invisible part CTi, and the overlapping portion CTo of the route content CTr are discriminated, and then the process proceeds to S80.

In S80, each of the visible non-overlapping portion CTvn, the invisible non-overlapping portion CTin, and the overlapping portion CTo is displayed with the different preset brightness based on the discrimination result. Next, in S90, it is determined whether or not the termination condition of the superimposed display of the route content CTr is satisfied. It is determined that the termination condition is satisfied based on, for example, the passage of the guidance point GP, the passage of the guidance end point set ahead of the guidance point GP in the traveling direction, and the like. While it is determined that the termination condition has not been satisfied, the processes from S60 to S80 are repeated to update the drawing shape and display mode of the route content CTr. On the other hand, when it is determined that the termination condition is satisfied, the process proceeds to S100. In S100, the entire route content CTr is hidden, and a series of processes is ended.

Next, the configuration and the advantageous effects of the HCU 100 of the first embodiment will be described.

The display generation unit 76 of the HCU 100 distinguishes, in the route content CTr, the visible part CTv that overlaps with the in-view angle visible area Av of the road surface, the invisible part CTi that overlaps with the in-view angle invisible area Ai of the road surface, and the overlapping portion Cto at which the visible part CTv and the invisible part CTi overlap with each other. The display generation unit 76 displays the overlapping portion CTo in a mode different from that of the visible non-overlapping portion CTvn in the visible part CTv and the invisible non-overlapping portion CTin in the invisible part CTi.

According to this, the overlapping portion CTo of the route content CTr is displayed in a mode different from that of the visible non-overlapping portion CTvn and the invisible non-overlapping portion CTin. Therefore, the driver as an occupant can recognize the overlapping portion CTo separately from the visible non-overlapping portion CTvn and the invisible non-overlapping portion CTin. Therefore, it is easy to recognize that the visible part CTv and the invisible part CTi of the route content CTr are overlapped with each other. As described above, the HCU 100 can provide display in an easy-to-understand manner for the driver.

In addition, the display generation unit 76 displays the visible non-overlapping portion CTvn and the invisible non-overlapping portion CTin in different modes. According to this, the driver can distinguish and recognize the visible non-overlapping portion CTvn and the invisible non-overlapping portion CTin. Therefore, each part CTvi, CTvn, and CTo of the route content CTr is displayed in a more understandable and distinct manner.

The display generation unit 76 displays the overlapping portion CTo with the brightness lower than the brightness of the invisible non-overlapping portion CTin, and displays the invisible non-overlapping portion CTin with the brightness lower than the brightness of the visible non-overlapping portion CTvn. According to this, among the three parts constituting the route content CTr, the overlapping portion CTo is visually recognized as the darkest, and the invisible non-overlapping portion CTin is visually recognized as darker than the visible non-overlapping portion CTvn. As the driver comprehensively visually recognizes these display modes, the driver can recognize as if the invisible portion CTi is dark as being blocked by the road surface, and the overlapping portion CTo is even darker due to the overlapping between the invisible part CTi and the visible part CTv. As described above, the display generation unit 76 can display the route content CTr in an easy-to-understand manner.

The display generation unit 76 displays the visible part CTv thereafter, prior to the invisible part CTi. According to this, the display generation unit 76 can display the invisible part CTi, which tends to be displayed on the side farther from the vehicle A, delayed from the visible part CTv. Therefore, it is possible to prevent the invisible part CTi from being displayed small at a stage relatively far from the in-view angle invisible area Ai. As a result, the display generation unit 76 can present the route content CTr to the driver in a more understandable manner.

The display generation unit 76 changes the display mode of the invisible part CTi from a part corresponding to the area visible from the driver in the in-view angle invisible area Ai to the display mode same as the visible part CTv. According to this, even when the in-view angle invisible area Ai changes to the in-view angle visible area Av as the vehicle A travels, the display of each part of the route content CTr can be updated in accordance with the change.

Second Embodiment

Figure 9:
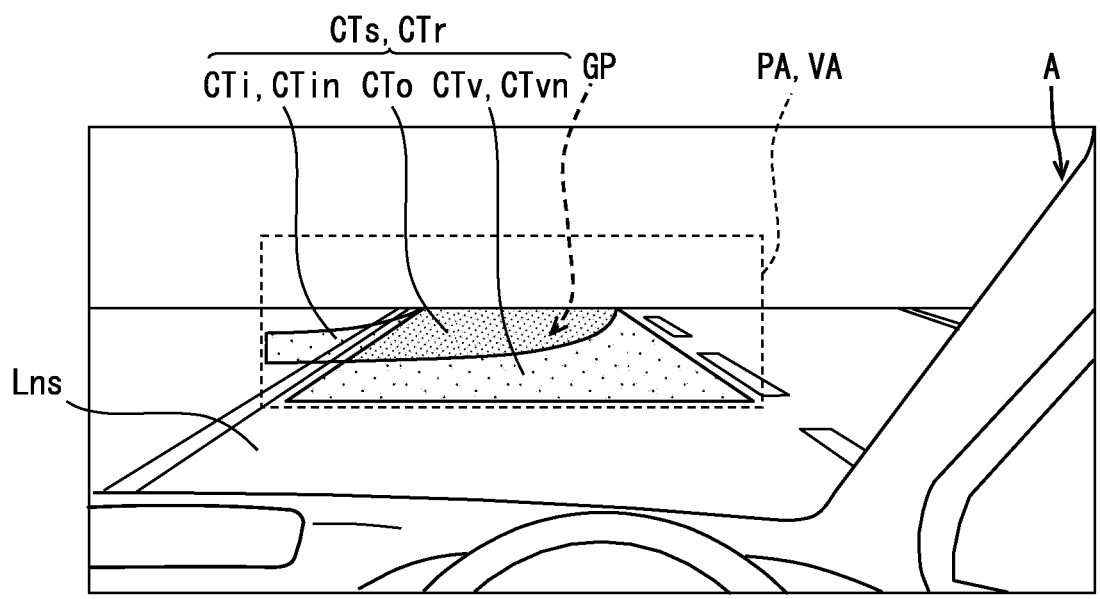
FIG. 9 is a diagram showing an example of a guidance display according to a second embodiment.

A second embodiment will be described hereinafter. The second embodiment is a modification of the HCU 100 of the first embodiment. In FIG. 9, components denoted by the same reference numerals as those in the drawings of the first embodiment are similar components and achieve the same operation and effects. The HCU 100 of the second embodiment is different from the first embodiment in the display mode of the route content CTr.

In the second embodiment, the display generation unit 76 displays the invisible non-overlapping portion CTin and the visible non-overlapping portion CTvn in the same display mode, and displays only the overlapping portion CTo in the display mode different from the invisible non-overlapping portion CTin and the visible non-overlapping portion CTvn.

In the example shown in FIG. 9, the brightness of the invisible non-overlapping portion CTin is set to be substantially the same as that of the visible non-overlapping portion CTvn. As such, the driver perceives the overlapping portion CTo as if it is darkened by the overlapping of the invisible part CTi and the visible part CTv. Therefore, the HCU 100 enables the route content CTr to be displayed in an easyto-understand manner for the driver, even when only the overlapping portion CTo is displayed in a different display mode.

Third Embodiment

Figure 10:
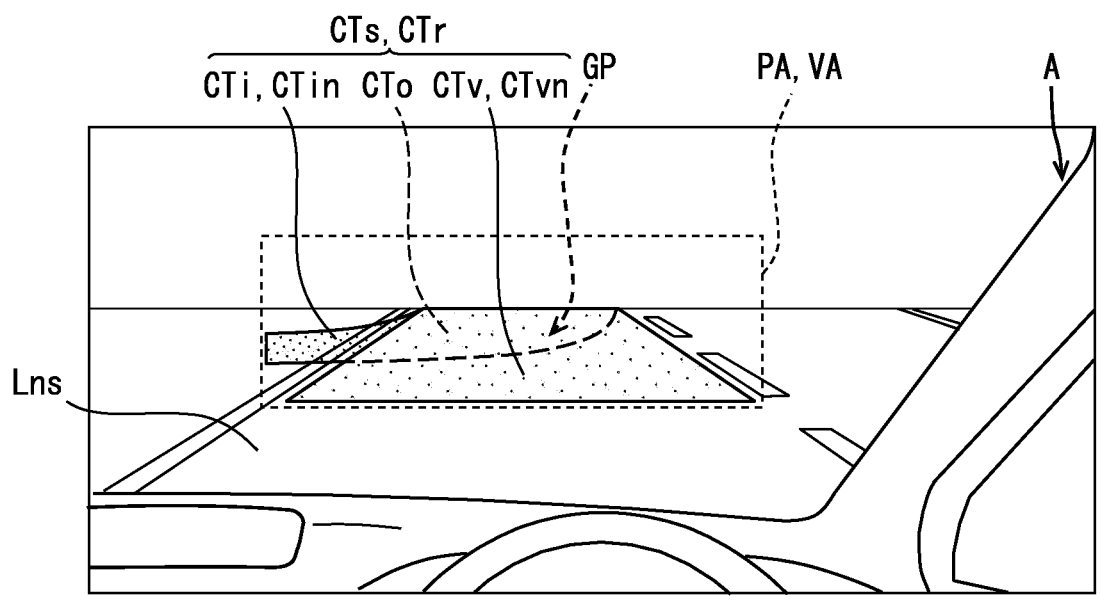
FIG. 10 is a diagram showing an example of a guidance display according to a third embodiment.

A third embodiment will be described hereinafter. The third embodiment is a modification of the HCU 100 of the first embodiment. In FIG. 10, components denoted by the same reference numerals as those in the drawings of the first embodiment are similar components and achieve the same operation and effects. The HCU 100 of the third embodiment is different from that of the first embodiment in the display mode of the route content CTr.

In the third embodiment, the display generation unit 76 displays the overlapping portion CTo and the visible non-overlapping portion CTvn in the same display mode, and displays the invisible non-overlapping portion CTin in a different display mode from the visible part CTv. The overlapping portion CTo and the visible non-overlapping portion CTvn are displayed in the same display mode so as to be visually recognized without being distinguished from each other by the driver. In the example shown in FIG. 10, the overlapping portion CTo and the visible non-overlapping portion CTvn are displayed with the same brightness. The invisible non-overlapping portion CTin is displayed with a lower brightness than the overlapping portion CTo and the visible non-overlapping portion CTvn. With such a display mode, a part of the invisible part CTi can be visually recognized as if it is partially blocked by the visible part CTv, and a non-blocked portion can be visually recognized separately from the visible part CTv.

According to the third embodiment described above, in regard to the route content CTr, the overlapping portion CTo is displayed in the same mode as the visible non-overlapping portion CTvn, and the invisible non-overlapping portion CTin is displayed in a different mode from the visible non-overlapping portion CTvn. Therefore, the driver can recognize that a portion of the invisible part CTi is blocked by the visible part CTv and a remaining portion of the invisible part CTi is deviated from the visible part CTv. Accordingly, the HCU 100 of the third embodiment can provide the display in an easy-to-understand manner for the occupant.

The overlapping portion CTo and the visible non-overlapping portion CTvn may be displayed in the same display mode in terms of transmittance, display color, pattern, or the like. Further, the invisible non-overlapping portion CTin and the visible part CTv may be displayed in different display modes by differentiating transmittance, display color, pattern, or the like.

Fourth Embodiment

A fourth embodiment will be described hereinafter. The fourth embodiment is a modification of the HCU 100 of the first embodiment. In FIGS. 11 to 14, components denoted by the same reference numerals as those in the drawings of the first embodiment are similar components and achieve the same operation and effects. The HCU 100 of the fourth embodiment is different from the first embodiment in that the HCU 100 superimposedly displays a point of interest (POI) content CTp indicating the POI The POI is a specific point, for example, a point that serves as a mark for reaching a destination. The POI includes a facility of a destination, an entrance to a site of a destination, a guidance point GP immediately before a destination, and the like. The POI may include points that the driver should pay attention to, other than the marks for reaching the destination. A POI display execution request requesting the display of the POI is provided to the HCU 100 by the navigation ECU 62 and the locator ECU 44. The POI display execution request is provided when the remaining distance Lr from the vehicle A to the POI falls below a predetermined threshold value (display threshold value). The POI display execution request includes at least the location information of the POI. When the POI display execution request is provided from the navigation ECU 62, the guidance information acquisition unit 73 functions as an acquisition unit for acquiring the POI display execution request in addition to the guidance execution request. In the following, an example of displaying, as the POI, the guidance point GP immediately before the destination will be described.

In order to display the virtual image of the POI content CTp, the virtual layout unit 75 first sets the position of the guidance point GP (POI) in the virtual space, and arranges a virtual object V2 at that position. The virtual object V2 is an object that defines the position and shape of the POI content CTp. The virtual object V2 has a shape that tapers off toward the position of the set guidance point GP. The virtual object V2 is arranged at a position where the tapered tip is directed downward and the tip is aligned with the guidance point GP on the virtual road surface.

Figure 11:
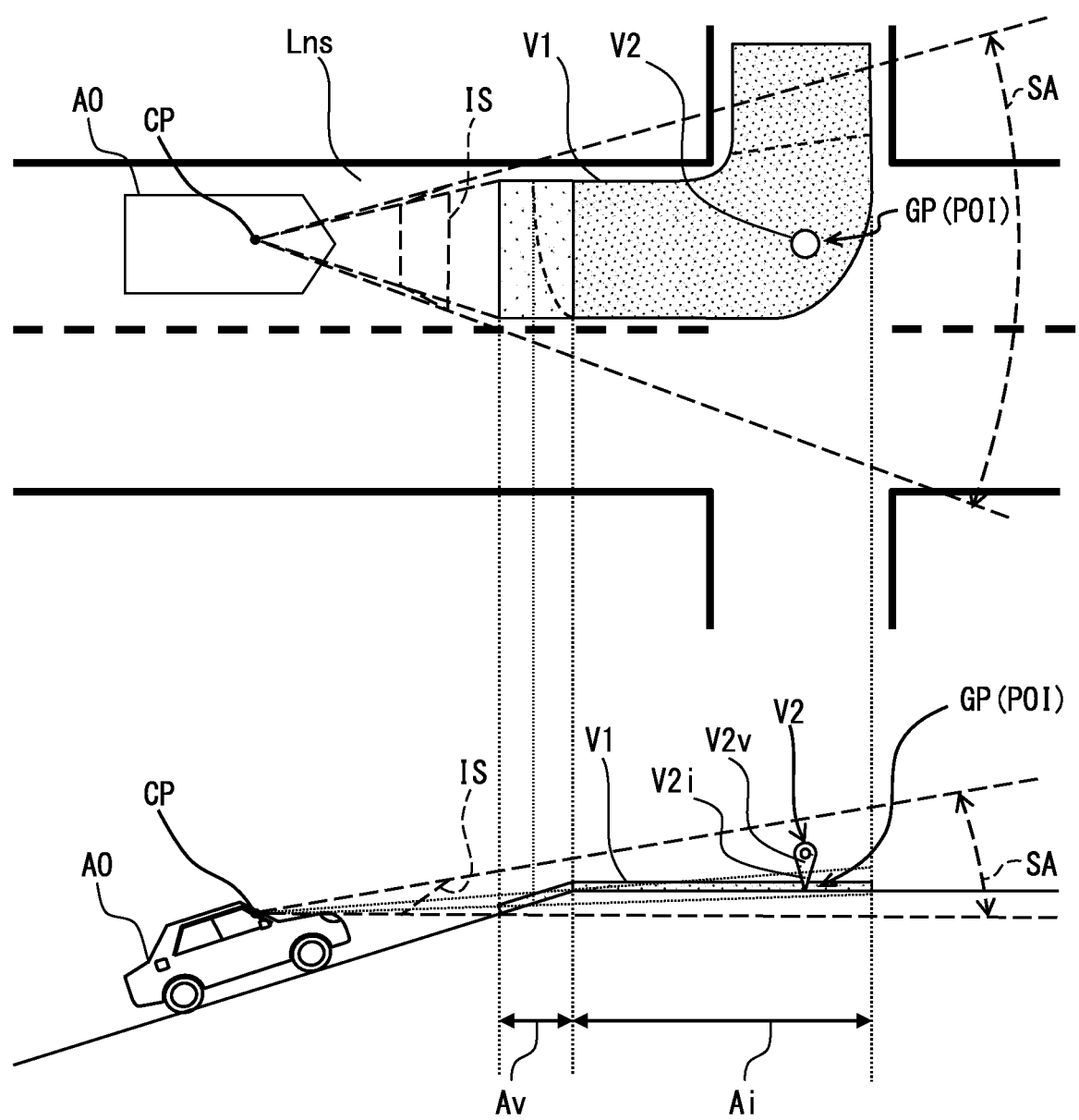
FIG. 11 is a diagram that visualizes and shows an example of a display layout simulation performed by a display generation unit of a HCU according to a fourth embodiment.

The virtual layout unit 75 estimates a virtually visible part V2v that is visible from the virtual camera position CP and a virtually invisible part V2i that is invisible from the virtual camera position CP, of the virtual object V2 included in the superimposition range SA. For example, as shown in FIG. 11, when there is no virtual structure such as a virtual road surface or a virtual building between the virtual camera position CP and a straight line connecting an arbitrary part of the virtual object V2, the virtual layout unit 75 estimates the part of the virtual object V2 as a virtually visible part V2v. When the virtual structure exists between the virtual camera position CP and the straight line connecting the arbitrary part of the virtual object V2, the virtual layout unit 75 estimates the part as the virtually invisible part V2i. The virtual layout unit 75 provides the display generation unit 76 with a simulation result including information regarding the range of the virtually visible part V2v and the virtually invisible part V2i of the virtual object V2.

The display generation unit 76 draws the POI content CTp based on the simulation result of the display layout. The drawing shape of the POI content CTp is determined based on the virtual object V2. The POI content CTp is drawn in a shape indicating the position of the guidance point GP in the foreground, and presents the existence and the position of the guidance point GP to the driver. The POI content CTp has, for example, a so-called map pin icon-like drawing shape that tapers off downward. The POI content CTp is an example of specific point content.

The display generation unit 76 distinguishes, in the POI content CTp, between a visible portion CTpv that is superimposed on a region visible from the driver in the foreground within the angle of view VA and an invisible portion CTp that is superimposed on a region invisible from the driver in the foreground within the angle of view VA. The display generation unit 76 distinguishes each of the portions CTpv and CTpi based on the estimation information of the virtually visible part V2v and the virtually invisible part V2i of the virtual object V2.

The display generation unit 76 displays the visible portion CTpv and the invisible portion CTpi in different display modes. In the examples shown in FIGS. 12 and 13, the invisible portion CTpi is displayed in a display mode having a lower brightness than the visible portion CTpv. Therefore, the driver can visually recognize a part of the POI content CTp dark as if it is blocked by the road surface. As such, it is easy to understand that the POI content CTp points to the position of the POI ahead of the uphill road. The display generation unit 76 may reverse the brightness of the invisible portion CTpi and the visible portion CTpv. Further, the display generation unit 76 may display the invisible portion CTpi and the visible portion CTpv in different display modes by differentiating the transmittance, the display color, the pattern, or the like.

Further, when the POI content CTp overlaps with other superimposition content CTs, the portion thereof is displayed darker. In the example shown in FIG. 13, the invisible portion CTpi of the POI content CTp overlaps with the overlapping portion CTo of the route content CTr. In this case, the invisible portion CTpi is set to have a lower brightness than that of the case where the invisible portion CTpi does not overlap the overlapping portion CTo. Further, the invisible portion CTpi is set to have a lower brightness than the overlapping portion CTo. As described above, the POI content CTp is displayed darker as it overlaps with the other superimposition content CTs, and the arrangement relationship with the other superimposition content CTs is presented more clearly. Further, the visible portion CTpv of the POI content CTp is displayed with a higher brightness than the overlapping portion CTo and the invisible non-overlapping portion CTin.

Figure 12:
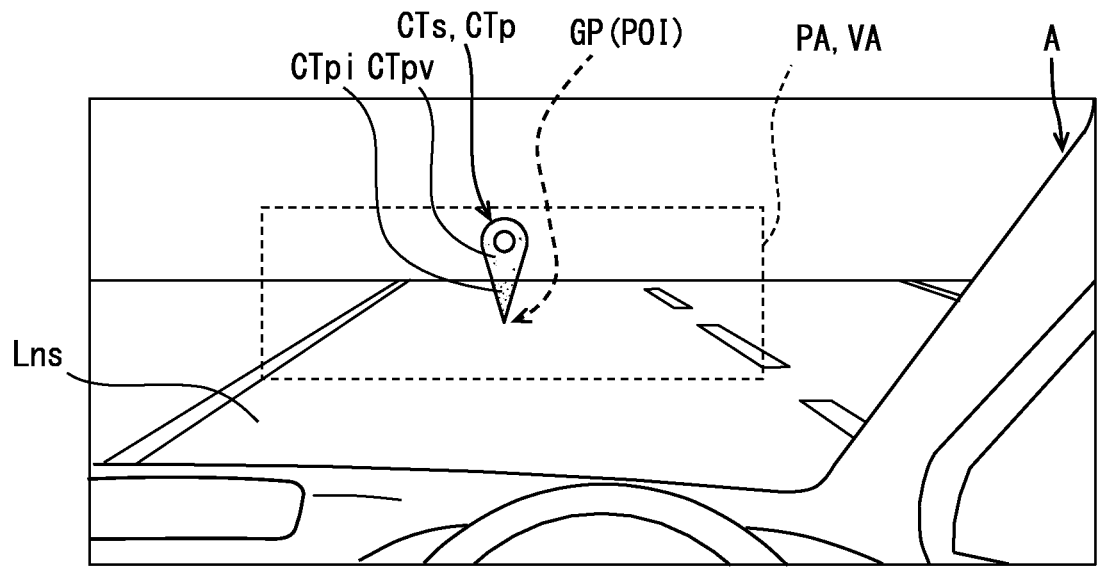
FIG. 12 is a diagram showing an example of a POI display.
Figure 13:
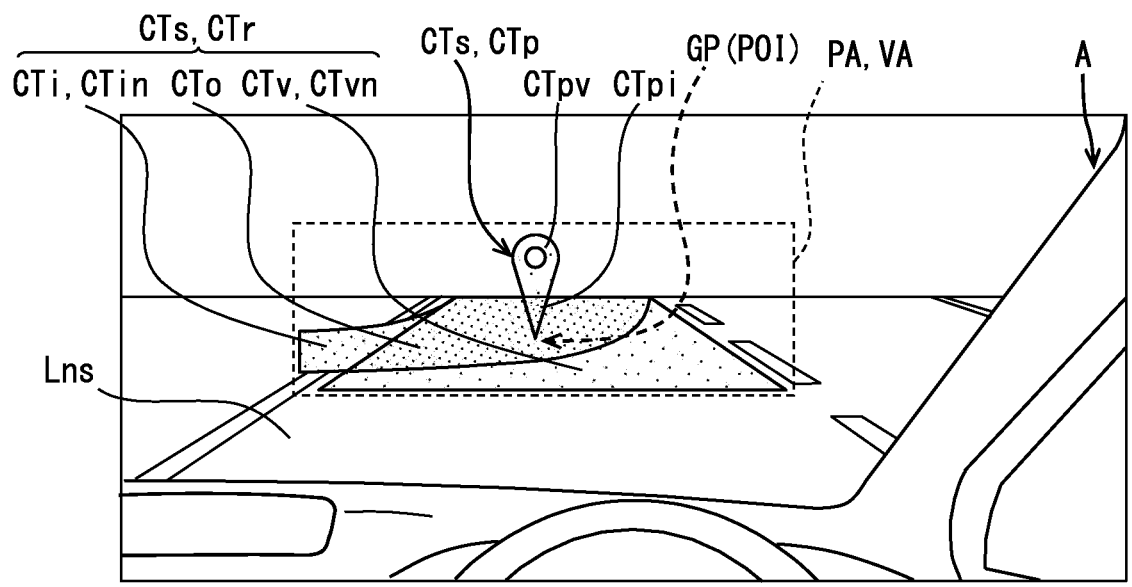
FIG. 13 is a diagram showing simultaneous display of the POI display and a guidance display.
Figure 14:
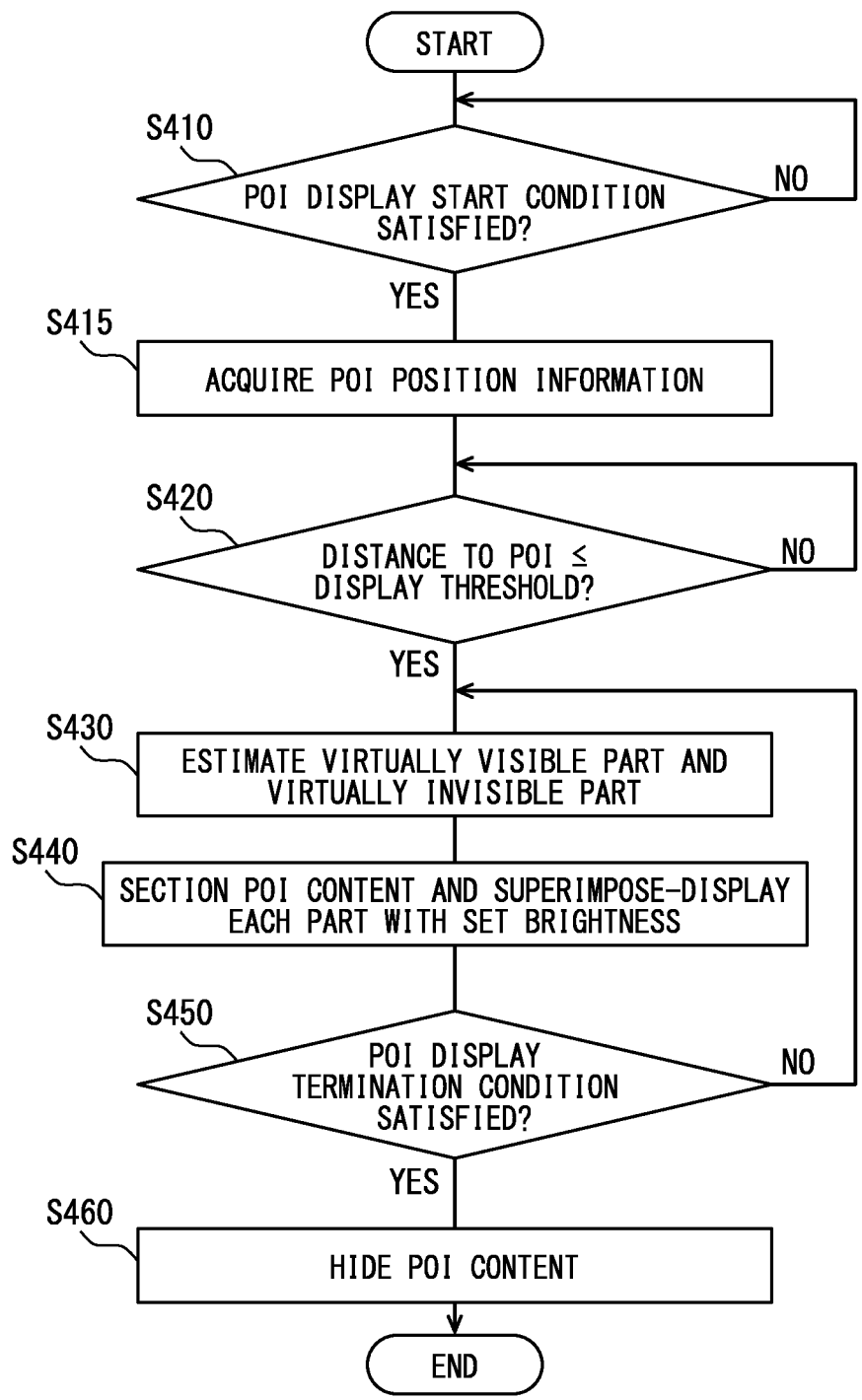
FIG. 14 is a flowchart showing a display control method according to the fourth embodiment.

Next, details of a display control method for switching the display of the POI content CTp based on a display control program will be described hereinafter based on a flow chart shown in FIG. 14 with reference to FIG. 12. A display control process shown in FIG. 14 is started by the HCU 100 that has completed the start-up process or the like, for example, by switching of the vehicle power supply to the on state.

In S410, it is determined whether or not the POI display start condition is satisfied. It is determined that the start condition is satisfied when, for example, the POI display execution request is acquired from the navigation ECU 62. When it is determined that the start condition is not satisfied, the determination of S410 is repeated until the start condition is satisfied. When it is determined that the start condition is satisfied, the process proceeds to S415 and the POI position information is acquired. When the POI display execution request includes the position information, S415 is executed at the same time as S410. When the POI position information is acquired, the process proceeds to S420.

In S420, it is determined whether or not the remaining distance Lr from the vehicle A to the guidance point GP is equal to or less than the display threshold value based on the subject vehicle position information acquired from the locator ECU 44 and the position information of the guidance point GP acquired from the navigation ECU 62. When it is determined that the remaining distance Lr exceeds the display threshold value, the determination of S420 is repeated until the remaining distance Lr becomes equal to or less than the display threshold value. On the other hand, when it is determined that the remaining distance Lr is equal to or less than the display threshold value, the process proceeds to S430.

In S430, the virtually visible part V2v and the virtually invisible part V2i of the virtual object V2 are estimated based on the eye point information acquired from the DSM 27, and the high-precision map data and the subject vehicle position information acquired from the locator ECU 44.

After the virtually visible part V2v and the virtually invisible part V2i are estimated, the process proceeds to S440.

In S440, the POI content CTp is sectioned to the visible portion CTpv and the invisible portion CTpi based on the estimation result, and the POI content CTp is superimposedly displayed at the set brightness corresponding to each of the portions CTpv and CTpi. After the superimposed-display is executed, the process proceeds to S450.

In S450, it is determined whether or not the POI display termination condition is satisfied. It is determined that the POI display termination condition is satisfied, for example, when the vehicle A passes the POI point. While it is determined that the end condition is not satisfied, the processes of S430 and S440 are repeated, and the sectioning of the respective portions CTpv and CTpi of the POI content CTp updated according to the change of the virtually visible part V2v and the virtually invisible part V2i due to the traveling. On the other hand, when it is determined that the termination condition is satisfied, the process proceeds to S460. In S460, the POI content CTp is hidden, and a series of processes is ended.

The display generation unit 76 of the fourth embodiment discriminates between the visible portion CTpv and the invisible portion CTp of the POI content CTp indicating the POI, and superimposedly displays the respective portions CTpv and CTpi in different modes. According to this, the driver can also distinguish between the visible portion CTpv and the invisible portion CTpi of the POI content CTp. Therefore, the display generation unit 76 can provide the driver with the display in an easy-to-understand manner.

Fifth Embodiment

Figure 15:
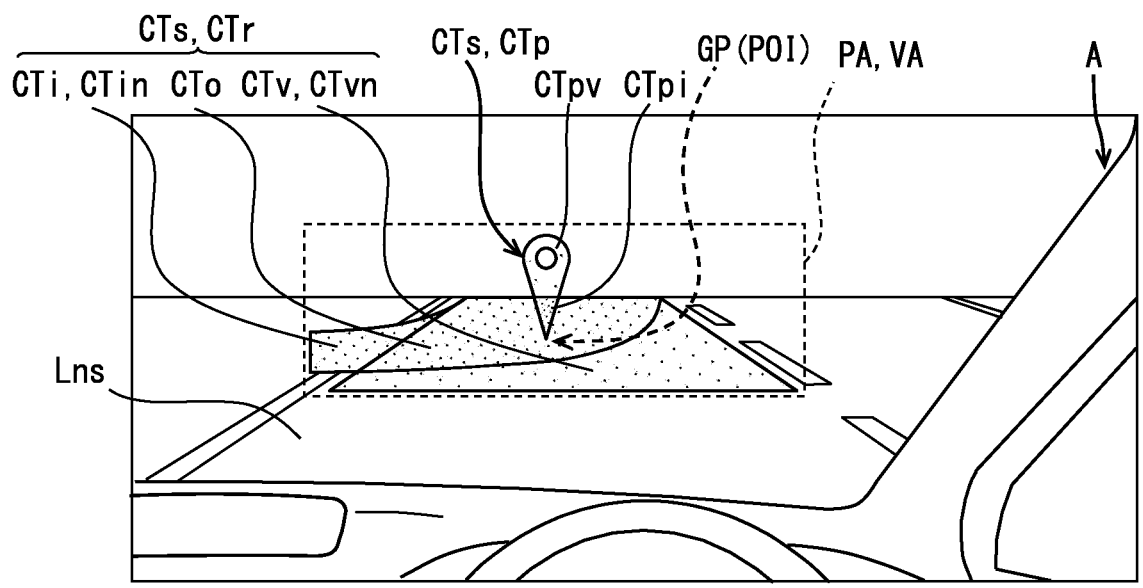
FIG. 15 is a diagram showing simultaneous display of a POI display and a guidance display according to a fifth embodiment.

A fifth embodiment will be described hereinafter. The fifth embodiment is a modification of the HCU 100 of the first embodiment. In FIG. 15, components denoted by the same reference numerals as those in the drawings of the first embodiment are similar components and achieve the same operation and effects.

When the invisible portion CTpi of the POI content CTp overlaps with the overlapping portion CTo of the route content CTr, the display generation unit 76 sets the display mode of the overlapping portion CTo to the same display mode as the invisible non-overlapping portion CTin. In the example shown in FIG. 15, the overlapping portion CTo is set to the same brightness as the invisible non-overlapping portion CTin. In this case, the invisible portion CTpi of the POI content CTp is set to a lower brightness than the invisible non-overlapping portion CTin and the overlapping portion CTo. Further, the visible portion CTpv is set to a higher brightness than the invisible non-overlapping portion CTin.

In the fifth embodiment, when the invisible portion CTpi of the POI content CTp and the overlapping portion CTo of the route content CTr overlap, the display mode of the overlapping portion CTo is set to the same display mode as the invisible non-overlapping portion CTin. Therefore, the portions having different display modes are reduced in the entirety of the two display contents CTp and CTr. Accordingly, the content display becomes simpler and the visibility is improved.

Other Embodiments

In the embodiment described above, the HCU 100 superimposedly displays the route content CTr that presents the route to the destination set by the navigation device 60.

Alternatively, a route content CTr that presents the scheduled traveling route of the vehicle A by the LTC, LCA, or the like may be displayed.

In the embodiment described above, the display generation unit 76 displays the visible non-overlapping portion CTvn, the invisible non-overlapping portion CTin, and the overlapping portion CTo with the different brightnesses degrading in this order. However, the degradation relationship of the brightness is not limited to the described example. Further, the display generation unit 76 displays the respective portions CTvn, CTin and CTo in the different modes by differentiating the brightness of each of the portions CTvn, CTin, and CTo. Alternatively, the display generation unit 76 may display the respective portions CTvn, CTin and CTo in different modes by differentiating the transmittance, display color, or pattern.

Figure 16:
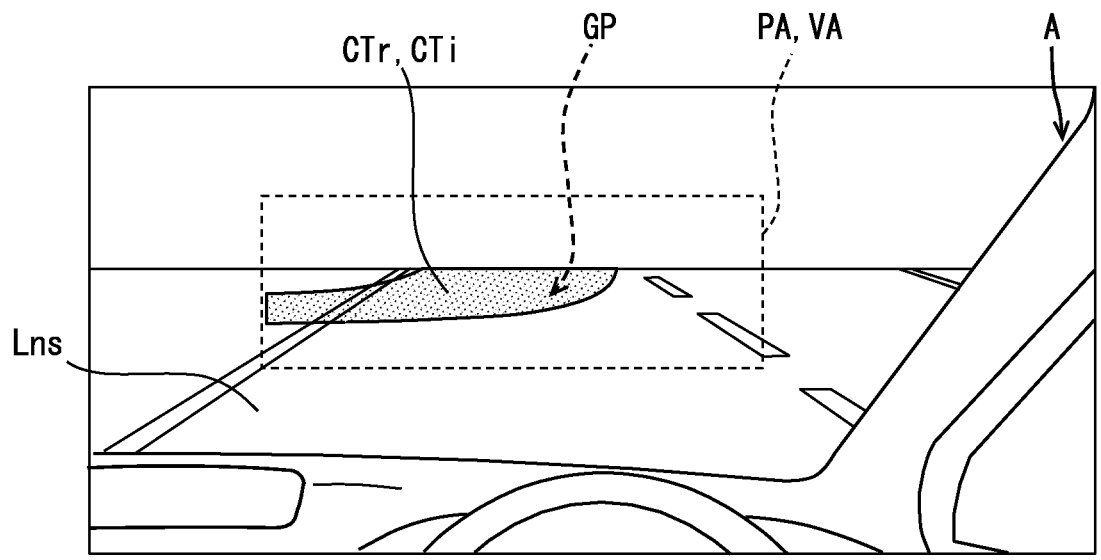
FIG. 16 is a diagram showing an example of a guidance display according to another embodiment.

In addition to the embodiment described above, the display generation unit 76 may hide the visible part CTv and display only the invisible part CTi in the route content CTr, as shown in FIG. 16. For example, the display generation unit 76 can perform such a display mode in a case where the inside of the angle of view VA is complicated by displaying the visible part CTv, such as a case where there is another display object superimposedly displayed within the in-view angle visible area Av.

The processing unit or processor of the embodiment described above may include one or more central processing units (CPUs). Such a processing unit or processor may be a processing unit including a graphics processing unit (GPU) and a data flow processor (DFP), and the like, in addition to the CPU. Further, the processing unit and the processor may be a processing unit including a field programmable gate array (FPGA), an IP core specialized in specific processing such as learning and inference of AI, and the like. Each arithmetic circuit of such a processor may be individually mounted on a printed circuit board, or may be mounted on an application specific integrated circuit (ASIC) or an FPGA.

Various non-transitory tangible memory medium (i.e., non-transitory tangible storage medium) such as a flash memory, or a hard disk, may be used as a memory device storing a control program. A form of such a storage medium may also be changed as appropriate. For example, the storage medium may be in a form of a memory card or the like, and may be inserted into a slot portion provided in an in-vehicle ECU and electrically connected to a control circuit.

The control unit and the method described in the present disclosure may be implemented by a special purpose computer configuring a processor programmed to perform one or more functions embodied by a computer program. Alternatively, the device and the method described in the present disclosure may be implemented by a dedicated hardware logic circuit. Alternatively, the device and the method described in the present disclosure may be implemented by one or more dedicated computers configured by a combination of a processor executing a computer program and one or more hardware logic circuits. The computer program may be stored, as instructions to be executed by a computer, in a tangible non-transitory computer-readable medium.

Next, the technical ideas that can be understood from the above-described fourth and fifth embodiments are added below.

The present disclosure provides a display control device. The display control device is used in a vehicle and controls superimposed display of a content on a head-up display. The display control device includes an acquisition unit that acquires position information of a specific point, and a display control unit that superimposedly displays a specific point content pointing to the specific point. The display control unit distinguishes a visible part and an invisible part of the specific point content, and causes to superimposedly display the visible part and the invisible part in different modes. The visible part is a part of the specific point content that is included in an angle of view of the head-up display, and superimposed in a spatial range visible from an occupant. The invisible part is a part of the specific point content that is included in the angle of view of the head-up display, and superimposed in a spatial range invisible from the occupant.

The present disclosure provides a display control program. The display control program is used in a vehicle and controls a superimposed display of a content on a head-up display. The display control program causes one or more processors to execute a process including: acquiring position information of a specific point; distinguishing a visible part and an invisible part of a specific point content pointing to the specific point; and superimposedly displaying the visible part and the invisible part in different modes, in which the visible part is a part of the specific point content that is included in an angle of view of the head-up display, and superimposed in a spatial range visible from an occupant, and the invisible part is a part of the specific point content that is included in the angle of view of the head-up display, and superimposed in a spatial range invisible from the occupant.

The present disclosure provides a non-transitory computer-readable storage medium. The non-transitory computer-readable medium storing instructions configured to cause one or more processors to: acquire position information of a specific point; distinguish a visible part and an invisible part of a specific point content pointing to the specific point; and superimposedly display the visible part and the invisible part in different modes, in which the visible part is a part of the specific point content that is included in an angle of view of the head-up display, and superimposed in a spatial range visible from an occupant, and the invisible part is a part of the specific point content that is included in the angle of view of the head-up display, and superimposed in a spatial range invisible from the occupant.

According to these aspects, the visible part of the specific point content that overlaps with the spatial range visible from the occupant and the invisible part that overlaps with the spatial range invisible from the occupant are superimposedly displayed in different modes. Therefore, the occupant can distinguish between the visible part and the invisible part. Accordingly, the display control device, the display control program, and the storage medium, which are capable of displaying an easy-to-understand display for the occupant can be provided.

Here, the process of the flowchart or the flowchart described in this application includes a plurality of sections (or steps), and each section is expressed as, for example, S10. Further, each section may be divided into several subsections, while several sections may be combined into one section. Furthermore, each section thus configured may be referred to as a device, module, or means.

Although the present disclosure has been described in accordance with the examples, it is understood that the present disclosure is not limited to the above examples or structures. The present disclosure encompasses various modifications and variations within the scope of equivalents. In addition, various combinations and forms, and further, other combinations and forms including only one element, or more or less than these elements are also within the scope and the scope of the present disclosure.

What is claimed is:

1. A display control device for a vehicle to control a superimposed display of a content by a head-up display, the display control device comprising:
    an estimation unit that estimates a visible area that is a part of a road surface in a foreground included in an angle of view of the head-up display and is visible from an occupant, and an invisible area that is a part of the road surface in the foreground included in the angle of view of the head-up display and invisible from the occupant; and
    a display control unit that causes a route content presenting a scheduled traveling route of the vehicle to be superimposedly displayed on the road surface, wherein
    the display control unit distinguishes, in the route content, a visible part superimposed in the visible area, an invisible part superimposed in the invisible area, and an overlapping portion at which the visible part and the invisible part overlap, and
    the display control unit causes the overlapping portion to be displayed in a display mode different from a display mode of a visible non-overlapping portion and a display mode of an invisible non-overlapping portion, the visible non-overlapping portion being a portion of the visible part out of the overlapping portion, and the invisible non-overlapping portion being a portion of the invisible part out of the overlapping portion.

2. The display control device according to claim 1, wherein
    the display control unit causes the visible non-overlapping portion and the invisible non-overlapping portion to be displayed in different display modes from each other.

3. The display control device according to claim 2, wherein
    the display control unit causes the overlapping portion to be displayed with a brightness lower than that of the invisible non-overlapping portion, and causes the invisible non-overlapping portion to be displayed with a brightness lower than that of the visible non-overlapping portion.

4. The display control device according to claim 1, wherein
    the display control unit causes the visible part to be displayed prior to the invisible part.

5. The display control device according to claim 1, wherein
    the display control unit causes the display mode of the invisible part to be changed to the same display mode as the visible part from a portion entering the visible area.

6. The display control device according to claim 1, wherein
    the display control unit causes a specific point content pointing to a specific point to be superimposedly displayed,
    the display control unit distinguishes a visible part and an invisible part of the specific point content, the visible part of the specific point content being included in the angle of view and superimposed in a spatial range visible from the occupant, the invisible part of the specific point content being included in the angle of view and superimposed in a spatial range invisible from the occupant, and
    the display control unit causes the visible part of the specific point content and the invisible part of the specific point content in different display modes from each other.

7. A non-transitory computer readable medium storing a computer program product comprising instructions for controlling a superimposed display of a content by a head-up display for a vehicle, the instructions being configured to, when executed by one or more processors, to cause the one or more processors to:
    estimate a visible area that is a part of a road surface in a foreground included in an angle of view of the head-up display and is visible from an occupant, and an invisible area that is a part of the road surface in the foreground included in the angle of view of the head-up display and invisible from the occupant;
    distinguish, in a route content that presents a scheduled traveling route of the vehicle and is superimposedly displayed on the road surface, a visible part superimposed in the visible area, an invisible part superimposed in the invisible area, and an overlapping portion at which the visible part and the invisible part overlap; and
    display the overlapping portion in a display mode different from a display mode of a visible non-overlapping portion and a display mode of an invisible non-overlapping portion, the visible non-overlapping portion being a portion of the visible part out of the overlapping portion, and the invisible non-overlapping portion being a portion of the invisible part out of the overlapping portion.

8. A display control device for a vehicle to control a superimposed display of a content by a head-up display, the display control device comprising:
    an estimation unit that estimates a visible area that is a part of a road surface in a foreground included in an angle of view of the head-up display and is visible from an occupant, and an invisible area that is a part of the road surface in the foreground included in the angle of view of the head-up display and invisible from the occupant; and
    a display control unit that causes a route content presenting a scheduled traveling route of the vehicle to be superimposedly displayed on the road surface, wherein
    the display control unit distinguishes, in the route content, a visible part superimposed in the visible area, an invisible part superimposed in the invisible area, and an overlapping portion at which the visible part and the invisible part overlap, and
    the display control unit causes an invisible non-overlapping portion, which is a portion of the invisible part out of the overlapping portion, to be displayed in a display mode different from a display mode of the visible part, and causes the overlapping portion to be displayed in a display mode same as the visible part.

9. A non-transitory computer readable medium storing a computer program product comprising instructions for controlling a superimposed display of a content by a head-up display for a vehicle, the instructions being configured to, when executed by one or more processors, to cause the one or more processors to:
    estimate a visible area that is a part of a road surface in a foreground included in an angle of view of the head-up display and is visible from an occupant, and an invisible area that is a part of the road surface in the foreground included in the angle of view of the head-up display and invisible from the occupant;

distinguish, in a route content that presents a scheduled traveling route of the vehicle and is superimposedly displayed on the road surface, a visible part superimposed in the visible area, an invisible part superimposed in the invisible area, and an overlapping portion at which the visible part and the invisible part overlap; and display an invisible non-overlapping portion, which is a portion of the invisible part out of the overlapping portion, in a display mode different from a display mode of the visible part, and display the overlapping portion in a display mode same as the visible part.

* * * * *